(12) United States Patent
Kudoh et al.

(10) Patent No.: US 7,796,586 B2
(45) Date of Patent: Sep. 14, 2010

(54) DATA STREAM TRANSMISSION/RECEPTION DEVICE

(75) Inventors: Hitoshi Kudoh, Kyoto (JP); Toshikazu Koudo, Hyogo (JP); Kazuhiro Mihara, Osaka (JP); Masaharu Tsujimura, Osaka (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 11/852,773

(22) Filed: Sep. 10, 2007

(65) Prior Publication Data

US 2008/0075086 A1 Mar. 27, 2008

(30) Foreign Application Priority Data

Sep. 11, 2006 (JP) .............................. 2006-245205

(51) Int. Cl.
*H04L 12/50* (2006.01)
*H04L 12/56* (2006.01)

(52) U.S. Cl. .................................... 370/357; 370/395.1

(58) Field of Classification Search ....................... None
See application file for complete search history.

(56) References Cited

U.S. PATENT DOCUMENTS 6,078,783 A 6/2000 Kawamura et al.
6,584,099 B1 6/2003 Sato et al.
2003/0041194 A1 2/2003 Sato et al.
2003/0193935 A1 10/2003 Sato et al.

FOREIGN PATENT DOCUMENTS

| JP | 07-222263 | 8/1995 |
|---|---|---|
| JP | 2000-253033 | 9/2000 |
| JP | 2005-142841 | 6/2005 |

OTHER PUBLICATIONS

IEC61883-1 consumer audio/video equipment digital interface issued on Feb. 1998 with corresponding document.
AV/C Digital Interface Command Set General Specification Version 3.0 issued in Apr. 15, 1998 with corresponding document.
EIA/CEA-775.1 Web-Enhanced DTC 1394 Interface Specification issued on Mar. 2000 with corresponding document.

*Primary Examiner*—Ayaz R Sheikh
*Assistant Examiner*—Blanche Wong

(57) ABSTRACT

A data stream transmission/reception device manages external devices in at least two groups, assigns independent resources to the groups, and for each group, a connection is made to the assigned hardware resource via a preferentially-used plug. This enables handling a plurality of streams at the same time in the case of being connected to a plurality of conventional external devices that have only one logical plug.

11 Claims, 22 Drawing Sheets

FIG. 4

EXTERNAL DEVICE MANAGEMENT INFORMATION TABLE

| MFR | MODEL | TYPE | COMMAND | EUI-64 | NODE ID | GROUP |
|---|---|---|---|---|---|---|
| M, INC | TU-MHD500 | TUNER | VCR | 17···453 | 1 | X |
| M, INC | TU-MHD300 | TUNER | VCR | 86···725 | 0 | Y |
| M, INC | NV-DH1 | VCR | VCR | 24···543 | 2 | X |
| M, INC | NV-DH2 | VCR | VCR | 52···984 | 3 | Y |

SUBUNIT MODEL FROM VIEWPOINT OF GROUP X

SUBUNIT MODEL FROM VIEWPOINT OF GROUP Y

SUBUNIT MODEL FROM VIEWPOINT OF GROUP X

SUBUNIT MODEL FROM VIEWPOINT OF GROUP Y

SUBUNIT MODEL FROM VIEWPOINT OF GROUP X

SUBUNIT MODEL FROM VIEWPOINT OF GROUP Y

SUBUNIT MODEL FROM VIEWPOINT OF DISC GROUP

SUBUNIT MODEL FROM VIEWPOINT OF VCR GROUP

SUBUNIT MODEL FROM VIEWPOINT OF 1ST DEVICE

SUBUNIT MODEL FROM VIEWPOINT OF 2ND DEVICE

SUBUNIT MODEL FROM VIEWPOINT OF 3RD DEVICE

DATA STREAM TRANSMISSION/RECEPTION DEVICE

BACKGROUND OF THE INVENTION

1. Field of the Invention

The present invention relates to technology for transmitting and receiving a data stream, which is typified by an MPEG2-TS (Transport Stream), and in particular to technology for transmitting and receiving a data stream via a bus such as the IEEE 1394 serial bus.

2. Description of the Related Art

Two types of communication methods may be used on the IEEE 1394 serial bus, namely isochronous communication, which is used for data stream transfers etc., and asynchronous communication, which is used for the exchanging of commands between devices, etc.

In the IEEE 1394 serial bus, the management of connections between devices is performed using the concept of a logical plug (hereinafter, called simply a "plug") for logical signal connections, in place of conventional physical signal connections (non-patent document 1: IEC 61883, Consumer audio/video equipment—Digital Interface). Due to being logical rather than physically existing, a plurality of such logical plugs can be defined for input to and output from external devices, regardless of the number of physical connection terminals. Specifically, a PCR (Plug Control Register) is used to manage inter-device connection statuses such as channel, data transfer rate and number of connections, in order to treat a data stream connection by isochronous communication as a plug (non-patent document 2: IEEE std 1394-1995, Standard for a High Performance Serial Bus). This enables defining the same number of plugs as there are sets of a PCR that manages input (hereinafter, called an "iPCR") and a PCR that manages output (hereinafter, called an "oPCR").

Also, the concept of a subunit model is used for devices connected to the IEEE 1394 serial bus to disclose their internal structure to each other and enable external control of each other. The subunit model of a device is defined using the concept of a unit and a subunit, where the unit roughly corresponds to the device itself that is to be recognized on the IEEE 1394 serial bus, and the subunit roughly corresponds to a function in the device. The subunit is an element constituting the unit, and the unit is constituted from one or more subunits. Types of subunits include general types such as VCR, Disc, Monitor, and Tuner, as well as Vendor types that each manufacturer can use to independently define functions, and a unit can include two or more subunits. Details of units and subunits are disclosed in, for example, non-patent document 3 (1394 TA, AV/C Digital Interface Command Set General Specification Version 3.0, Apr. 15, 1998).

The structure of a subunit model of a connected device can be found out by issuing a UnitInfo command and a SubunitInfo command, which are defined as AV/C commands, to the connected device.

Also, the number of plug control registers a connected unit has can be found out by issuing a PlugInfo command, which is also an AV/C command.

The devices connected to the IEEE 1394 serial bus reference each others' subunit models, which are defined by the concepts described above, to control the plug assigned to each unit and perform logical connection processing.

Furthermore, patent document 1 (Japanese Patent Publication No. 3080094) discloses technology in which a unit is provided with a plurality of plugs so as to be able to handle the transmission/reception of two or more data streams. Specifically, the subunit model is constituted from one VCR unit as the unit, which includes two VCR subunits, and a separate plug is provided for each of the subunits. This enables an external device to perform recording using the plug whose ID is 0 (hereinafter, called "Plug0") and that corresponds to the VCR0 subunit, which is one of the subunits, while at the same time, playback to an external device is performed using a plug whose ID is 1 (hereinafter, called "Plug1") and that corresponds to the VCR1 subunit, which is another subunit.

However, existing commercialized devices generally have not been developed based on the assumption that another connected device includes a plurality of plugs, and most have been designed to be compatible only with other devices that include a single plug. Therefore, even if another device has two plugs, a conventional device including only one plug always tests a connection to Plug0 and determines that a connection with the other device cannot be established if Plug0 is unavailable, regardless of whether Plug1 in the other device is available.

As a result of this situation, even if a new device that can handle a plurality of streams is designed, a plurality of streams cannot be handled simultaneously due to conventional devices.

One method of enabling a plurality of data streams to be input or output over a connection with a conventional device is providing a plurality of units. However, this method requires providing a plurality of entirely independent IEEE 1394 serial bus controllers, and the same number of independent circuits as streams to be handled, which is a problem in terms of cost.

SUMMARY OF THE INVENTION

An object of the present invention is to provide an inexpensive data stream transmission/reception device that can transmit and receive data streams with a plurality of external devices in parallel, even in the case of a conventional external device that is only compatible with the use of a single logical plug.

In order to achieve the above object, the present invention is a data stream transmission/reception device that connects a first external device on a bus to a first internal hardware resource via a logical plug to perform data stream transmission/reception, and connects a second external device on the bus to a second internal hardware resource via an other logical plug to perform data stream transmission/reception, the data stream transmission/reception device including: a first status register operable to indicate a status of the logical plug for connection to the first internal hardware resource; a second status register operable to indicate a status of the other logical plug for connection to the second internal hardware resource; a source identification unit operable to identify a transmission-source external device with reference to an access therefrom; and a response switch unit operable to, if the identified transmission-source external device is the first external device, assign an address of a preferentially-used plug to the first status register, the address existing in an address space that receives the access from the transmission-source external device, and if the identified transmission-source external device is the second external device, assign the address of the preferentially-used plug to the second status register.

According to the data stream transmission/reception device of the present invention, even if the first external device that is a conventional device has recognized the logical plug managed by the first status register as the preferentially-used plug and is connected to the first internal hardware resource, the second external device that is also a conventional device recognizes the logical plug managed by the second status register as the preferentially-used plug, and therefore can connect to the second internal hardware resource via such logical plug.

Therefore, in the data stream transmission/reception device of the present invention, a plurality of data streams can be handled at the same time even if the connected external devices are conventional devices.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings:

FIG. 4 shows an exemplary external device management information table;

DESCRIPTION OF THE PREFERRED EMBODIMENTS

Embodiments of the present invention are described below with reference to the drawings.

Embodiment 1

Figure 1:
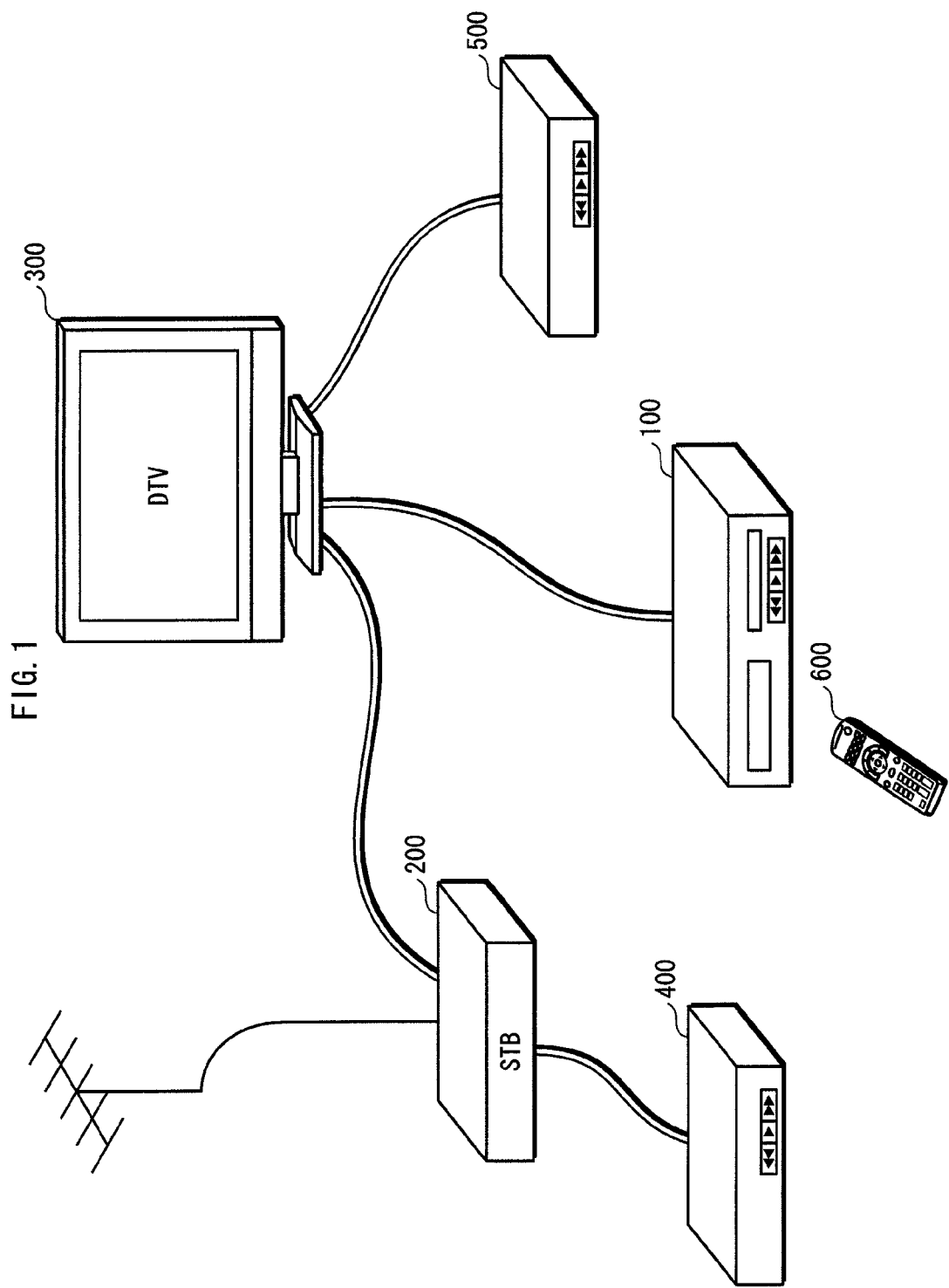
FIG. 1 shows a usage pattern of a data stream transmission/reception device 100 of embodiment 1.

First is a description of a usage act of a data stream transmission/reception device pertaining to the present invention, which is one of various implementation acts. FIG. 1 shows a usage pattern of a data stream transmission/reception device 100 pertaining to the present invention. In FIG. 1, the data stream transmission/reception device pertaining to the present invention is the data stream transmission/reception device 100. The data stream transmission/reception device 100, an STB 200, a DTV 300, a recorder 400, and a recorder 500 are interconnected via an IEEE 1394 serial bus. Also, the data stream transmission/reception device 100 receives user operations via a remote controller 600.

The data stream transmission/reception device 100 performs the transmission/reception of a data stream with the other devices on the IEEE 1394 serial bus, performs recording to an internal recording medium, and performs playback from the recording medium.

The STB 200, the DTV 300, the recorder 400, and the recorder 500 are conventional devices that each include only one plug.

This completes the description of the usage act of the data stream transmission/reception device pertaining to the present invention.

The following describes the internal structure of the data stream transmission/reception device 100 pertaining to the present invention.

Figure 2:
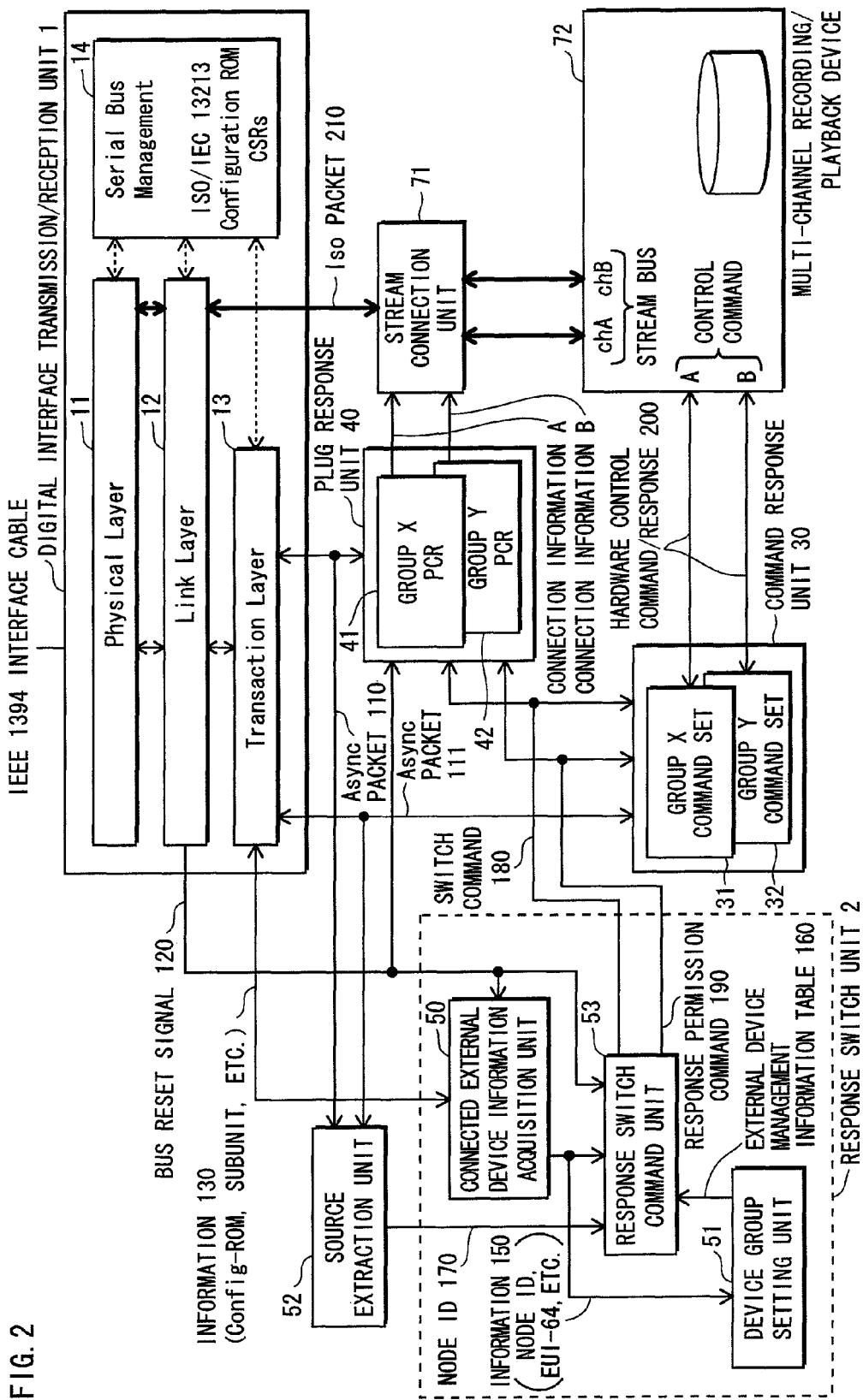
FIG. 2 shows the internal structure of the data stream transmission/reception device 100 of embodiment 1.

FIG. 2 shows portions of the internal structure of the data stream transmission/reception device 100 that pertain to stream transmission/reception. In FIG. 2, the data stream transmission/reception device 100 includes a digital interface transmission/reception unit 1, a response switch unit 2, a command response unit 30, a plug response unit 40, a source extraction unit 52, a stream connection unit 71, and a multi-channel recording/playback device 72.

The digital interface transmission/reception unit 1 is a control unit for the IEEE 1394 serial bus, and includes a Physical Layer 11, a Link Layer 12, a Transaction Layer 13, and a Serial Bus Management 14. The digital interface transmission/reception unit 1 controls isochronous communication, which realizes the transfer of a data stream, and asynchronous communication, which realizes the exchange of commands between devices, etc. In FIG. 2, an Iso packet indicates the flow of a data stream transferred by isochronous communication, and an Async packet indicates the flow of a command etc. transferred by asynchronous communication. A detailed description of operations performed by the digital interface transmission/reception unit 1 has been omitted since they are recited in detail in non-patent document 2 etc.

The response switch unit 2 includes a connected external device information acquisition unit 50, a device group setting unit 51, and a response switch command unit 53. The connected external device information acquisition unit 50 acquires Config-ROM (Configuration ROM) content, unit information, subunit information, a Node Identifier (hereinafter, called "Node ID"), and the like from connected external devices via the Transaction Layer 13 of the digital interface transmission/reception unit 1. The Config-Rom content includes an EUI-64. EUI-64 is an abbreviation for "Extended Unique Identifier, 64 bits", and is also commonly called an EUID or a GUID (Global Unique Identifier). An EUI-64 is a identification number unique to a device, and different numbers are assigned to different devices, even if the devices are the same type, thereby enabling the identification of each device. On the other hand, a Node ID is an identification number that is determined when a device is physically connected to the IEEE 1394 serial bus. Node IDs are serial numbers that are assigned beginning from 0. A new Node ID is assigned to a device when the IEEE 1394 serial bus is reset and when power supply to the device is initiated. The connected external device information acquisition unit 50 notifies the acquired information to the device group setting unit 51.

Figure 3:
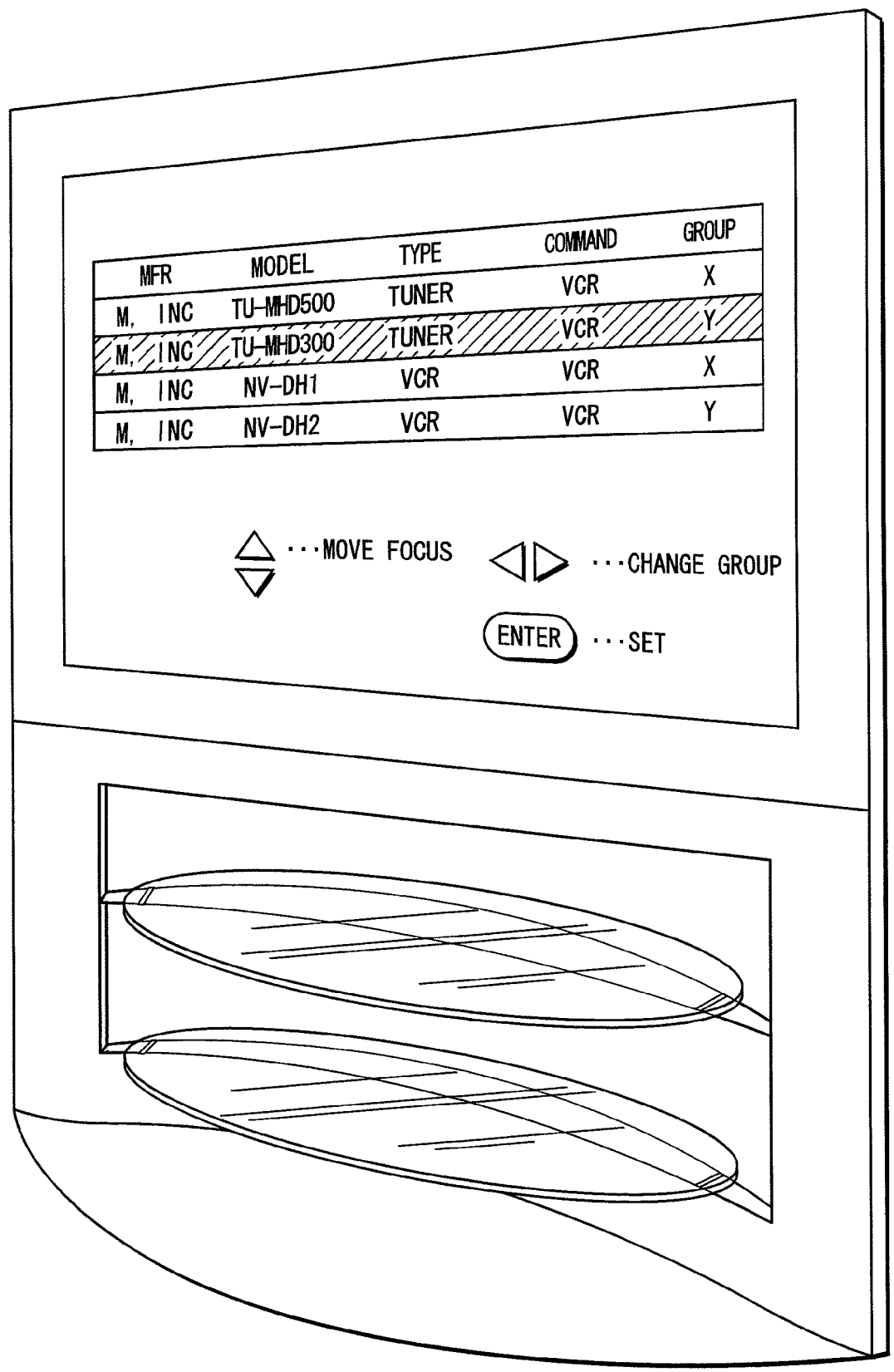
FIG. 3 shows an exemplary GUI display for receiving a grouping operation.

The device group setting unit 51 generates an external device management information table including the EUI-64s and Node IDs of external devices in correspondence with each other, with use of the information notified by the connected external device information acquisition unit 50, as well as provides a user with a specification environment for grouping the external devices, with use of a GUI (Graphical User Interface) such as is shown in FIG. 3, and registers groups set by the user in the external device management information table. After generation, the external device management information table is stored in an area secured in a work memory by the device group setting unit 51. An important function of the device group setting unit 51 is determining the correspondence between an EUI-64 and the user-set group of an external device.

FIG. 4 shows an example of the external device management information table. The right-most column in FIG. 4 is a list of set groupings. Although described as "17 . . . 453" and the like in FIG. 4, the EUI-64 information is in actuality defined by 64-bit-length data. In addition to EUI-64s, Node IDs and groups, information registered in the external device management information table includes manufacturer names (MFR), model names, unit types, response commands, etc. for devices.

The response switch command unit 53 refers to the external device management information table generated by the device group setting unit 51, compares a Node ID sent from the source extraction unit 52 and the external device management information table, and specifies to which group an external device that issued an asynchronous packet belongs. Upon specifying the source group, the response switch command unit 53 controls the operations of the command response unit 30 and the plug response unit 40 by notifying switch commands, which are in accordance with the specified group, to the command response unit 30 and the plug response unit 40.

The command response unit 30 includes a group X Command Set 31 that notifies hardware control commands and responses to a channel A (hereinafter, called "chA") of the multi-channel recording/playback device 72, and a group Y command set 32 that notifies hardware control commands and responses to a channel B (hereinafter, called "chB") of the multi-channel recording/playback device 72.

The plug response unit 40 includes a group X PCR 41 and a group Y PCR 42. The group X PCR 41 is a status register that indicates the status of a logical plug and manages a connection to chA, and the group Y PCR 42 is a status register that indicates the status of a logical plug and manages a connection to chB. The plug response unit 40 refers to the group X PCR 41 and the group Y PCR 42 when responding to an access to one of the plugs by an external device.

An Async packet transmitted from an external device to the command response unit 30 or the plug response unit 40 includes the Node ID of the external device from which the transmission originated, and the source extraction unit 52 extracts the Node ID and notifies the extracted Node ID to the response switch command unit 53. The extraction of the Node ID from the Async packet by the source extraction unit 52 and the comparison of the Node ID and the external device management information table by the response switch command unit 53 realizes the source identification function for identifying the transmission source of an asynchronous packet.

The multi-channel recording/playback device 72 is a hardware resource that can simultaneously handle data streams on the two channels chA and chB.

This completes the description of the internal structure of the data stream transmission/reception device 100.

Operations

The following describes operations performed by the data stream transmission/reception apparatus having the structure shown in FIG. 2, when connected to external devices such as shown in FIG. 1.

Figure 5:
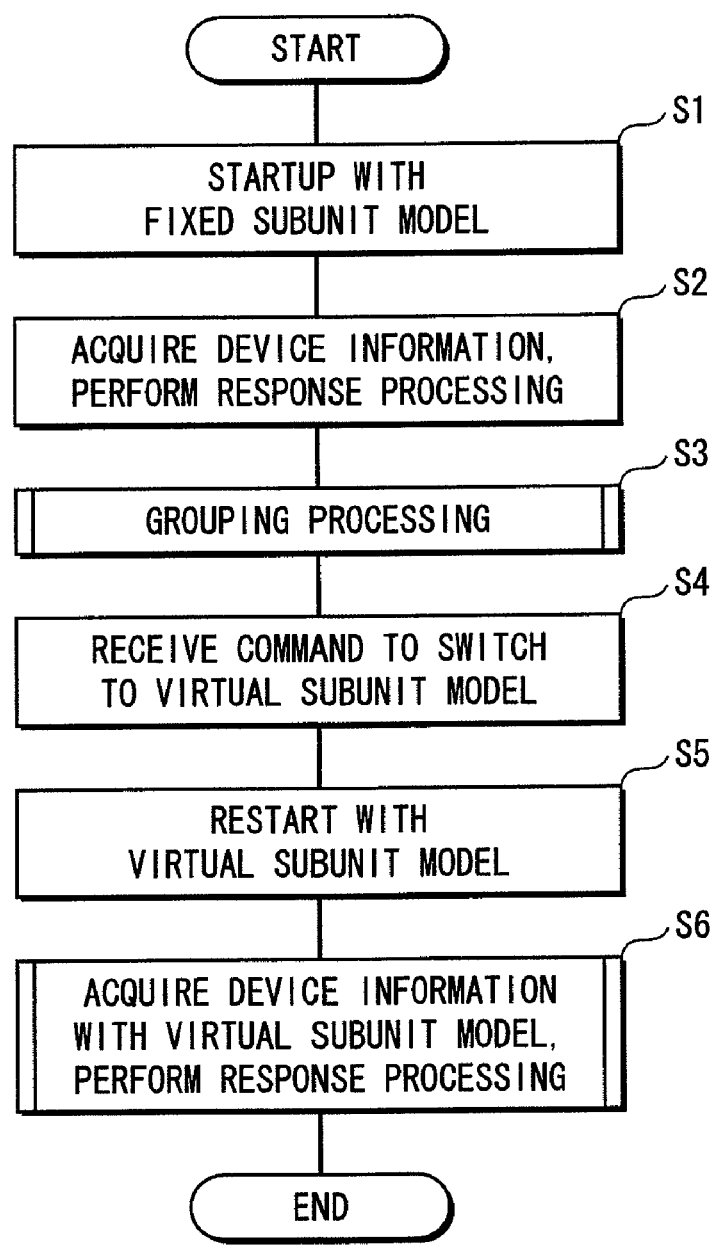
FIG. 5 is a flowchart showing a flow of operations performed by the data stream transmission/reception device 100.

The following first describes an overview of operation procedures, which is followed by detailed descriptions of the operations. FIG. 5 is a flowchart showing a flow of operations performed by the data stream transmission/reception device 100.

Step S1 is an initial startup of the data stream transmission/reception device 100. At this time, the data stream transmission/reception device 100 responds to a check from any device by disclosing the same subunit model, similarly to a conventional device. Hereinafter, the subunit model of a conventional device that discloses the same structure to any device is called a fixed subunit model.

Most devices connected to an IEEE 1394 serial bus check the subunit model of other connected devices directly after the introduction of power supply. In step S2, such an external device and the data stream transmission/reception device 100 perform operations for checking each other's subunit model and acquiring each other's Node ID. By checking each other's subunit model, devices on the bus can find out whether another device has a connectable plug, and determine which commands can be issued, and in particular, the types of commands for instructing the performance of an operation.

After such information has been acquired in step S2, in step S3 the response switch unit 2 executes, with use of the acquired information, processing for grouping the external devices via a GUI.

The generation of the external device management information table of FIG. 4 in the above procedure enables the data stream transmission/reception 100 to disclose different subunit models depending on the group to which an external device belongs, by referring to the external device management information table. Hereinafter, a subunit model that discloses a different structure depending on the group to which an external device belongs is called a virtual subunit model.

However, since an external device on the bus is also checking the subunit model of the data stream transmission/reception device 100 in step S1, there will be an inconsistency in the checking of subunit models between the devices if a virtual subunit model is operating in only the data stream transmission/reception device 100. Therefore, after the generation of the external device management information table, when a user instruction to cause operation of the virtual subunit model is received in step S4, the data stream transmission/reception device 100 issues a bus reset signal and restarts with the virtual subunit model in step S5.

As a result of the bus reset due to the restart, the devices connected to the IEEE 1394 serial bus check each other's subunit models, and since the virtual subunit model is operating in the data stream transmission/reception device 100, the data stream transmission/reception device 100 discloses different subunit models to the external devices depending on the group to which the external devices belong.

This completes the outline of processing up to where the data stream transmission/reception device 100 operates with the virtual subunit model.

Hereafter, the data stream transmission/reception device 100 establishes a connection with an external device in order to send/receive a data stream, receives an operation command for performing recording, playback, etc. from the external device, and performs the operation. In such a case, the data stream transmission/reception device 100 can simultaneously handle two streams since the connection to an external device belonging to group X is established via chA, which has been assigned to group X command set 31, and the connection to an external device belonging to group Y is established via chB, which has been assigned to group Y command set 32.

The following describes details of processing by which the external devices are grouped with use of the GUI in step S3.

In the grouping processing, the device group setting unit 51 displays a grouping GUI image on the screen of the DTV 300 with use of the EIA-775 GUI display technology, which is a standard for performing bitmap transmission of an OSD screen to a DTV or the like via an IEEE 1394 bus. Thereafter, grouping is performed.

A description of details of EIA-775 has been omitted since they are disclosed in the following documents.

The HDTV receives on-screen display (OSD) information from the video source, such as a set top box, using the EIA-775 standard.

EIA-775A—EIA DTV link over 1394 specification (1394 link between the STB and DTV)

EIA-775

EIA-775-1 defines 1394 interface for Digital TVs. Includes OSD requirements, AV/C command set requirements.

EIA075-2 defines service selection information for Digital Storage Media.

Figure 6:
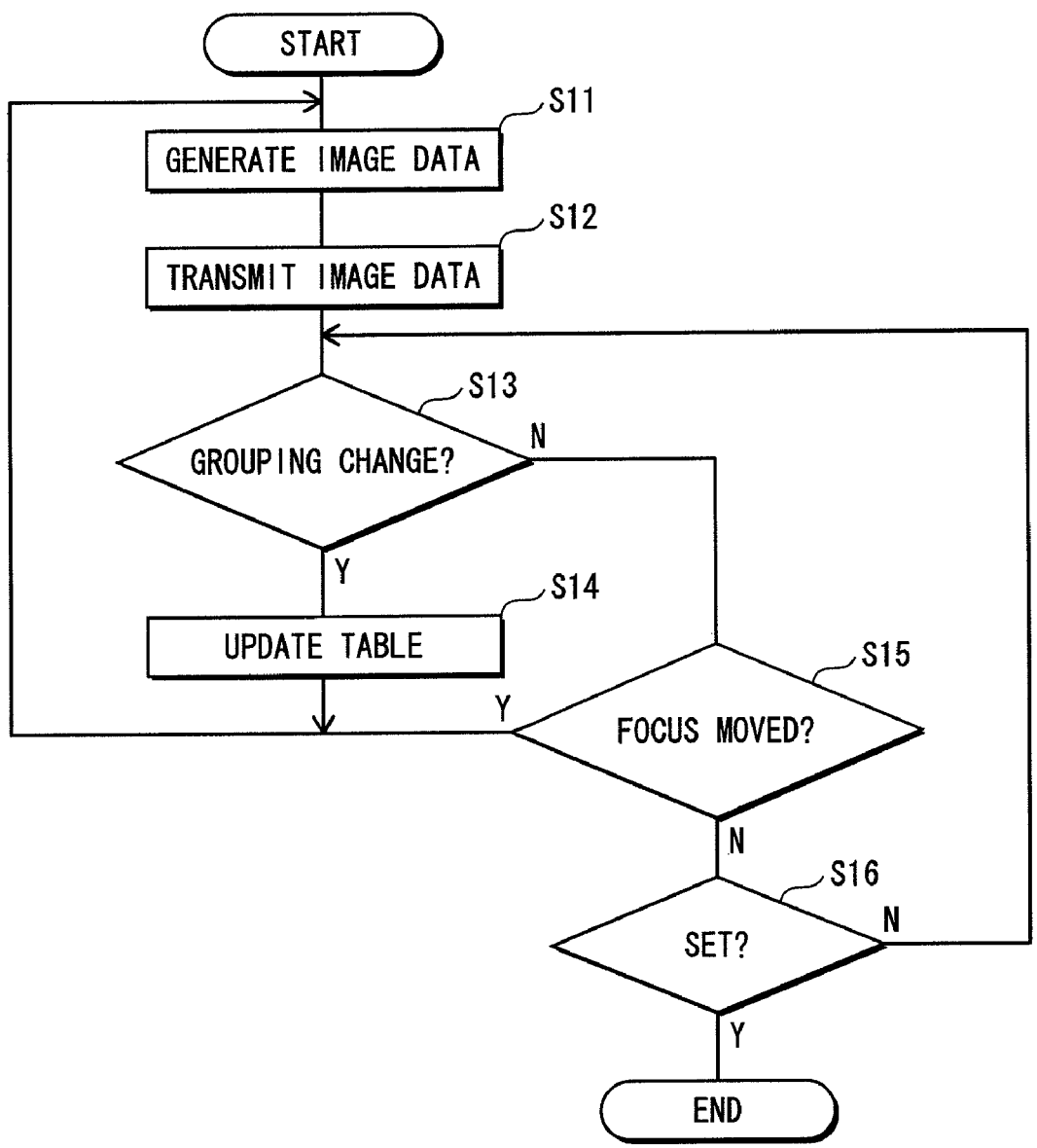
FIG. 6 is a flowchart showing a grouping processing procedure.

FIG. 6 is a flowchart showing the grouping processing procedure.

First, with reference to the external device management information table, the device group setting unit 51 generates bitmap data for a GUI image (displayed on the screen of the DTV 300 in FIG. 3) that includes a list of devices on the IEEE 1394 bus (step S11). The generated bitmap data is transmitted from the data stream transmission/reception device 100 to the DTV 300 via the IEEE 1394 serial bus and the GUI image is caused to be displayed on the screen of the DTV 300 (step S12)

FIG. 3 shows an exemplary GUI that provides a visual group specification environment to a user. The user refers to the list in the GUI image, and with use of the remote controller 600, groups the connected external devices by selecting a device, changing its group, and performing a determination operation. The determination of groups is performed from, for example, the following viewpoint. The user refers to the list shown in FIG. 3 to find out that two tuners and two D-VHS devices are connected via the IEEE 1394 serial bus. The two tuners are conventional devices that are compatible with only one plug. The user therefore registers one of the tuners in group X and the other tuner in group Y in order to enable the data stream transmission/reception device 100 to perform scheduled recording from both of the tuners simultaneously. Also, the user registers one of the D-VHS devices in group X and the other D-VHS device in group Y in order to enable storing a program from the data stream transmission/reception device 100 to both D-VHS devices at the same time.

The processing of step S13 to step S16 is repeated in the device group setting unit 51 in accordance with the user operations, the external device management information table is updated in accordance with the group modifications, and the bitmap data is updated and transmitted each time a device selection operation or a group modification operation is received. When a determination operation is received after the above operations, the external device management information table is updated to the grouping status displayed on the screen.

This completes the detailed description of the processing for grouping the external devices with use of the GUI.

Note that although included in the external device management information table, EUI-64s and node IDs are not displayed in the exemplary GUI image shown in FIG. 3 due to being values that would be difficult for the user to understand. Also, not all of the information shown in FIG. 3 is necessary. A portion of the display may be omitted or a different method of expression may be used, provided that information necessary for performing group setting is displayed to the user.

Also, the display of the GUI image and the performance of grouping can be implemented by GUI display technology other than according to the EIA-775 standard, such as data broadcast technology in which a GUI screen is described in BML and transmitted to a digital television that has a BML browser function.

Furthermore, if a personal computer or the like exists on the IEEE 1394 serial bus, grouping can be implemented by a method in which the pre-grouping external device management information list is notified to the personal computer by a command via the IEEE 1394 serial bus, and the result of grouping performed on the personal computer is notified from the personal computer to the data stream transmission/reception device 100. Also, if there is an STB or the like that has a grouping function similar to the personal computer, the external device management information table can be notified to the STB or the like, and the result of grouping can be acquired via the bus.

This completes the detailed description of processing for grouping the external devices with use of the GUI.

The following describes the details of a connection operation from an external device to the data stream transmission/reception device 100 and command issuing. A connection operation corresponds to the stage at which connection is established with the external device in order to transmit/receive a data stream, and command issuing corresponds to basic operations performed after the stage at which the external device checks the subunit model of the recording/playback apparatus in step S2, and the stage at which the virtual subunit model is operating and the recording/playback apparatus is performing recording, playback or the like in accordance with a recording, playback, or other operation instruction received from the external device.

Figure 7:
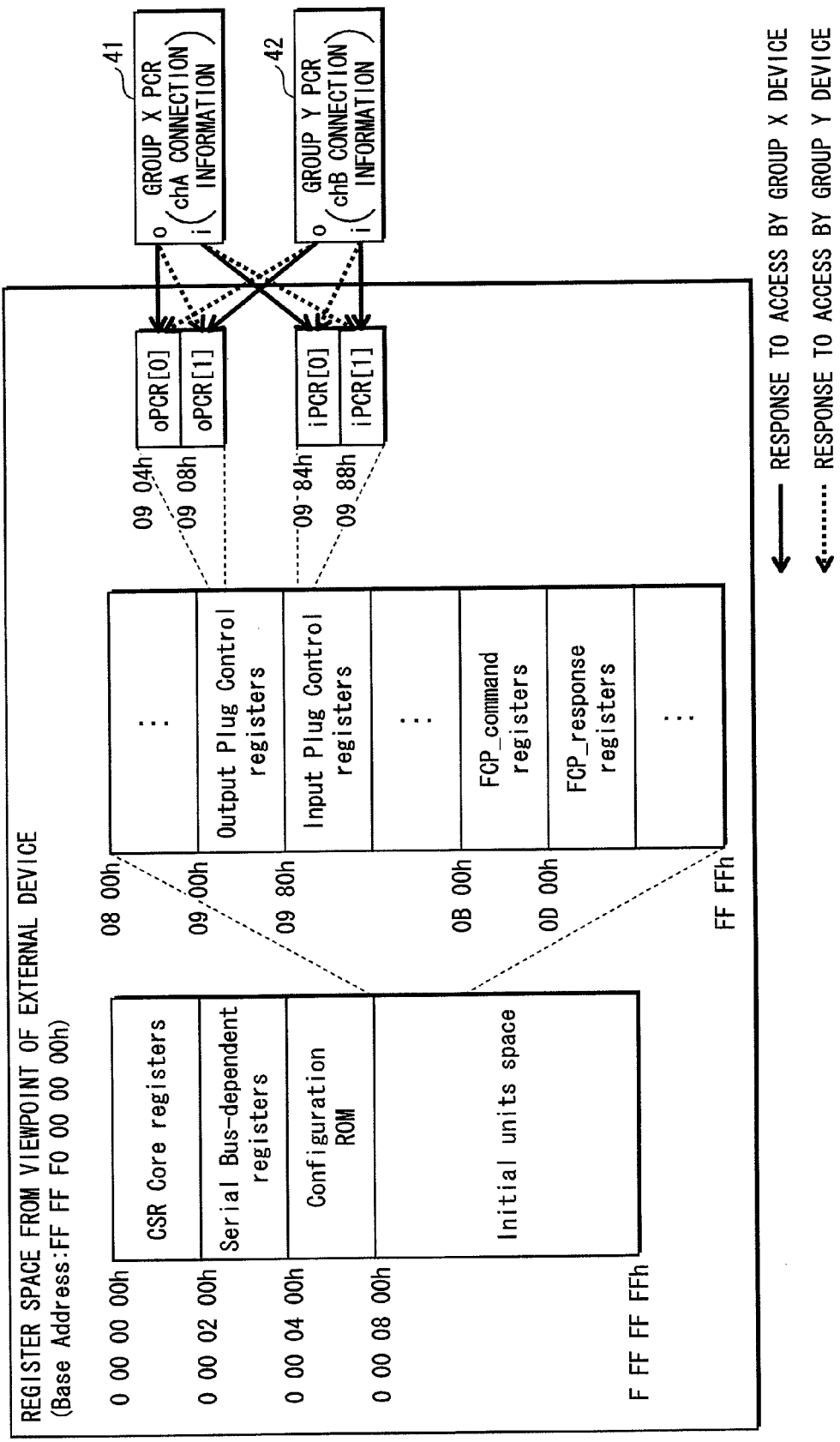
FIG. 7 illustrates an operation by which a plug response unit 40 switches a response in a register space of the data stream transmission/reception device 100 from the viewpoint of an external device.

When the external device views the data stream transmission/reception device of FIG. 1, an address space such as shown in the framed portion of FIG. 7 can be seen. Output Plug Control registers (hereinafter, abbreviated as "oPCR") are assigned from address 0900h, Input Plug Control registers (hereinafter, abbreviated as "iPCR") are assigned from address 0980h, FCP Command registers are assigned from address 0B00h, and FCP Response registers are assigned from address 0D00h. A connection operation initiated by the external device is performed with use of oPCR and iPCR. Access to the oPCR and iPCR corresponds to Async packet 110 of FIG. 2.

Also, the issuing of commands and the checking of statuses is performed with the use of the FCP Command registers and the FCP Response registers. Access to the FCP Command registers and the FCP Response registers corresponds to Async packet 111 in FIG. 2. Access to the FCP Command registers by the external device is called an AV/C command request, and access to the FCP Response registers by the external device is called an AV/C command response. Hereinafter, AV/C commands are referred to as simply "commands". Also, "command issuing" and "command request" have the same meaning, and may be used interchangeably in the broad sense. Readquad transactions (reading) defined by IEEE 1394 are used by the external device to perform access for reading a register from an address, and lock transactions are used to perform access for rewriting. Also, the Async packets 110 and 111 are transmitted and received via the Transaction Layer 13 of the digital interface transmission/reception unit 1 as a result of the above accesses.

Connection Operation

Connection processing is performed between the external device and the data stream transmission/reception device 100 by setting a channel, data transfer rate, number of connections, etc. with use of the oPCR and the iPCR. External access to the oPCR and the iPCR is realized by the plug response unit 40 shown in FIG. 2. The plug response unit 40 generates different responses depending on the group to which external devices belong. The connection operation is used after the above-described operation procedure of FIG. 5 has been completed. Details of the response method pertaining to the connection operation are described later.

Command Issuing

Also, the connected external device issues a command (performs a request) to the data stream transmission/reception device 100 with use of the FCP Command registers, and monitors the status of the data stream transmission/reception device 100 with use of the FCP Response registers. As a result of the above command, a recording or playback operation etc. is initiated, and the status of the data stream transmission/reception device 100 is again monitored. The command request and response from the external device are performed due to the access to the FCP Command registers and the access to the FCP Response registers. In FIG. 2, the command request received in the above access is sent as the Async packet 111 to the command response unit 30, which generates a response. In other words, the AV/C command request from the external device is inserted into the Async packet 111. The command response unit 30 generates different responses depending on the group to which external devices belong. The command issuing from the external device is used in the stage at which the external device checks the subunit model of the recording/playback device in step S2 of FIG. 5, and the stage at which the virtual subunit model is operating and the recording/playback apparatus is performing recording, playback or the like in accordance with a recording, playback, or other operation instruction received from the external device.

Subunit Model

The various commands include a command for defining the subunit model of a device, and a command for instructing a device to perform an operation. The external device and the data stream transmission/reception device 100 issue commands such as the following in order to check each other's subunit model.

UnitInfo command: for acquiring the type etc. of a unit

SubunitInfo command: for acquiring the type etc. of a subunit

PlugInfo: for acquiring the number etc. of plugs

Connect command: for acquiring information about subunits and plug connections etc.

By issuing the above commands and generating responses, the command response unit 30 functions as the subunit model check unit and the subunit model notification unit, and enables the checking of subunit models between devices. The above command issuing is used in step S2 of FIG. 5.

The connection operation, which corresponds to the stage at which a connection is established with the external device in order to transmit/receive a data stream, and command issuing, which corresponds to the stage at which the virtual subunit model is operating and the recording/playback apparatus is performing recording, playback or the like in accordance with a recording, playback, or other operation instruction received from the external device, are performed after the subunit model has been checked.

Figure 8:
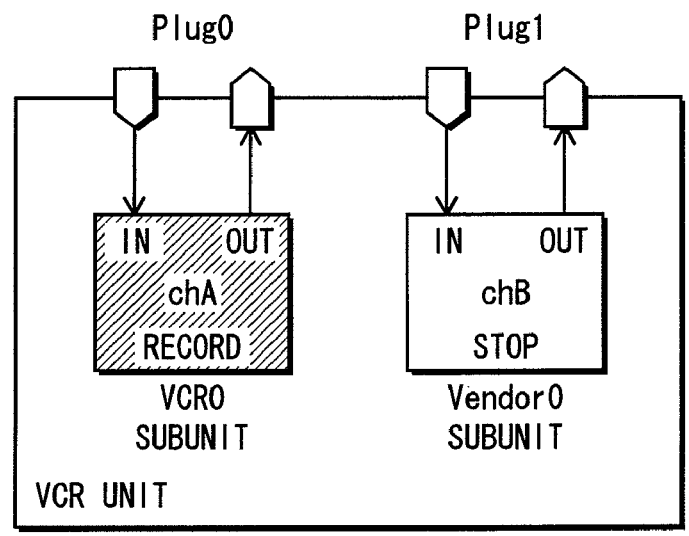
FIG. 8 diagrammatically shows a subunit model of the data stream transmission/reception device 100, which is shown by a command response.
Figure 8:
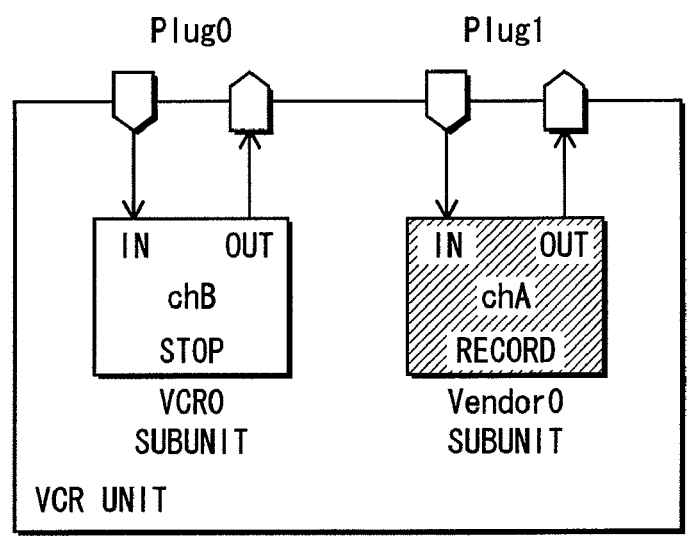

FIG. 8 shows a view of a model when the external device checks the subunit model of the data stream transmission/reception device 100 with use of the above-described commands. In FIG. 8, "VCR0 subunit" represents the VCR subunit whose ID is number 0, and "Vendor0 subunit" represents the vendor subunit whose ID is number 0. Also, "Plug0" represents the plug whose ID is number 0. In FIG. 8, the wedge-shaped arrows represent input and output, and each plug has been assigned an input and an output.

In the data stream transmission/reception device 100, the external devices are managed in two groups, responses are switched according to the groups, and different virtual subunit models are disclosed according to the groups. From the viewpoint of the external devices, the data stream transmission/reception device 100 has two types of subunit models. The top half of FIG. 8 shows the subunit model from the viewpoint of group X, and the bottom half of FIG. 8 shows the subunit model from the viewpoint of group Y. The two subunit models correspond to responses by the group X Command Set 31 and responses by the group Y Command Set 32 respectively. Each subunit model includes one unit, and each unit includes two subunits. Also, each subunit includes one plug. A hardware resource has been independently assigned to each subunit.

Specifically, in the subunit model viewed by group X, chA has been assigned to the VCR0 subunit, and chB has been assigned to the Vendor0 subunit. Also, the first plug (Plug0) has been assigned to the VCR0 subunit, and the second plug (Plug1) has been assigned to chB. As a result of such assignments, the VCR0 subunit is in a controllable status at all times from the viewpoint of devices in group X, and the hardware resource of chA has been assigned to group X.

On the other hand, these assignments appear in the opposite from the viewpoint of group Y.

Specifically, in the subunit model viewed by group Y, chB has been assigned to the VCR0 subunit, and chA has been assigned to the Vendor0 subunit. As a result of such assignments, the VCR0 subunit is in a controllable status at all times from the viewpoint of devices in group Y, and the hardware resource of chB has been assigned to group Y.

According to the subunit models of FIG. 8, upon reception of a command from an external device belonging to a predetermined group, a response corresponding to the subunit that corresponds to the first plug that has been assigned to the predetermined group is transmitted, and upon reception of a command from an external device belonging to a group other than the predetermined group, a response corresponding to the subunit that corresponds to a plug other than the first plug is transmitted.

The correspondence between the above subunit models and the hardware resources of the data stream transmission/reception device 100 is realized by the stream connection unit 71 of FIG. 2. The stream connection unit 71 refers to the connection status of each group managed by the plug response unit 40 (in FIG. 2, the connection information A and connection information B) in order to appropriately assign a hardware resource to a data stream (corresponds to the Iso packet 210 in FIG. 2) received from the digital interface transmission/reception unit 1.

Accordingly, the above structure in which the subunit models appear differently the groups enables external devices to correctly observe the availability of connections on the IEEE 1394 serial bus and the availability of hardware in the data stream transmission/reception device 100. Enabling statuses to be monitored from any group without a logical failure is important in order to operate an interface while adhering to the IEEE 1394 serial bus standard. Also, providing the structure for enabling accurate external monitoring of operation statuses is essential for performing operation tests as well as important for performing various evaluations to ensure the quality of the present invention as a product.

Operation Command

After the external device has checked in step S2 of FIG. 5 that the subunit model is as described above, the external devices are grouped by the user in step S3, and then connection processing is performed. Thereafter, the external device that is aware of the subunit model issues a command instructing the data stream transmission/reception device 100 to perform an operation. Specifically, the issued command is a Record command, Play command, or the like.

For example, if an external device X1 belonging to group X issues a Record command to the VCR0 subunit, the corresponding subunit shown in the top half of FIG. 8 enters a recording status. In this status, from the viewpoint of group Y, the Vendor0 subunit appears to be in the recording status, as shown in the bottom half of FIG. 8. Although FIG. 8 only shows a case in which chA is in the recording status and chB is in a stopped status, if, for example, the external device X1 belonging to the group X issues a Stop command and a Play command, chA enters a stopped status and then transitions to a playback status. Also, if, for example, an external device Y1 belonging to group Y issues a Play command to the VCR0 subunit, chB enters a playback status. In this status, from the viewpoint of group X, the Vendor0 subunit appears to be in the playback status.

The Record command sent from the external device X1 is transmitted via the FCP Command Registers shown in FIG. 7, and is received by the command response unit 30 as the Async packet 111 of FIG. 2. The Async packet 111 is simultaneously received by the source extraction unit 52 as well, which extracts the transmission-source node ID 170. The response switch command unit 53 judges, based on the node ID 170, that the transmission-source device belongs to group X, and transmits to the command response unit 30 a switch command 180 indicating the group to which a response is to be sent. As a result, the command response unit 30 receives the Async packet 111 as a group X command, and causes chA of the multi-channel recording/playback device 72 to enter a recording status (corresponds to a hardware control command/response 200 in FIG. 2).

The command response unit 30 not only processes the command relating to the operation instruction such as the Record command, but also generates, for example, a command response for monitoring the operation status of the multi-channel recording/playback device 72, and transmits the response to the external device. The transmission of the command is performed by sending the Async packet 111 shown in FIG. 2 to the external device, which is transmitted in a direction opposite to the reception direction.

Although FIG. 2 shows that the command response unit 30 independently performs A-side or B-side control for each group, this is merely to simplify the depiction. As is clear in the subunit model of FIG. 8, which was described above, it is also possible to have a structure in which group X can monitor the status of the hardware resource assigned to group Y.

Connection Operation Details

FIG. 7 illustrates a response switch operation performed by the plug response unit 40.

The framed portion on the left side of FIG. 7 represents an address space viewed by an external device, and portions outside the frame on the right side represent management information of groups in the plug response unit 40. In FIG. 7, oPCR[0] and iPCR[0] represent the first plug (Plug0), and oPCR[1] and iPCR[1] represent the second plug (Plug1). The plug response unit 40 includes group X plug information and group Y plug information, which have been assigned to chA and chB hardware resources respectively.

As shown by the solid arrows, when an external device belonging to group X accesses oPCR and iPCR, the plug response unit 40 responds to the access to Plug0 based on the group X PCR 41, and responds to the access to Plug1 based on the group Y PCR 42. Also, as shown by the dotted-line arrows, when an external device belonging to group Y access oPCR and iPCR, the plug response unit 40 responds to the access to Plug0 based on the group Y PCR 42, and responds to the access to Plug1 based on the group X PCR 41. The external device accesses oPCR and iPCR of the data stream transmission/reception device 100 with use of the Async packet 110 shown in FIG. 2. The switching of responses according to groups is realized by the source extraction unit 52 extracting the source node ID from the Async packet 110, and the response switch unit 2 controlling the plug response unit 40 based on the extraction result.

Responding as described above enables the realization of assigning hardware resources independently to groups, and for each group, causing the assigned hardware resource to establish an external connection via the first plug (Plug0).

The operation shown in FIG. 7 illustrates that when an external device belonging to a predetermined group performs a register access, a connection to the hardware resource assigned to the predetermined group is established via the first plug, and when an external device belonging to a group other than the predetermined group performs a register access, a connection is established via a plug other than the first plug.

Even in the case of an older connected external device that can only use one plug, switching the response according to the group enables simultaneously performing recording and playback by managing groups X and Y separately.

Operations During a Bus Reset

The following describes problems when there is a change in the physical connection structure of devices and means for solving such problems.

The previously described node IDs are unique numbers assigned to devices, and can therefore be used to identify the devices when there has not been a change in the physical connection structure. However, such node ID numbers are re-assigned when there has been a change in the physical connection structure of the devices. Also, there is no guarantee that the node ID assigned after the change in the physical connection structure will be the same as before the change. This means that if only node IDs are used for identification, there is the possibility that the group management will be different after physical connection structures have changed. As such, there will be a mistake in the groupings after a change in the physical connection structures if a transmission source is specified with reference to the node IDs in the information from before the change. In other words, if connections between devices are managed using only node IDs, there will be cases in which a transmitted response corresponds to an improper group.

In order to solve this problem, the response switch unit 2 of the present invention acquires a bus reset signal 120 from the digital interface transmission/reception unit 1, and with reference to the acquired bus reset signal 120, the connected external device information acquisition unit 50 re-acquires the external device information. Also, since proper responses cannot be made during the information re-acquisition, the response switch command unit 53 suppresses responses by transmitting a response permission command 190, for prohibiting responses, to the command response unit 30 and the plug response unit 40. In other words, the command response unit 30 and the plug response unit 40 are put in a "response suspension" status. The response permission command 190 is disabled when the re-acquisition of external device information is completed, and the command response unit 30 and the plug response unit 40 are then able to transmit responses in accordance with the groups. The most important part of the external device information is the EUI-64 information included in the Config-ROM. Re-checking the correspondence between the node IDs and the EUI-64 information during a bus reset enables continuing to correctly manage the external device groups. The UnitInfo, SubunitInfo, etc. do not necessarily need to be re-acquired when the external device information is re-acquired during a bus reset.

The following methods may be used to suspend responses.

Methods for suspending responses:

(1) Do not return an acknowledgement.

(2) Return an acknowledgment, but do not return a response.

(3) Return an acknowledgment along with a conflict response, busy response, type error response, etc.

(4) Return an acknowledgment as well as a rejection response.

(5) Do not return an acknowledgment, but return default device information as the response.

An acknowledgment is a response used in communication via the IEEE 1394 serial bus, and represents an acknowledgment that an Async packet has been received. Any of the above methods may be used as long as the external device does not determine that the device of the present invention is in an abnormal status.

The EUI-64 information enables unique identification of a device. Directly after a bus reset, connected devices often all check the EUI-64 information at the same time. It is therefore possible for a device other than the device of the present invention to acquire the EUI-64 information before the device of the present invention and perform a connection operation or issue a command to the device of the present invention. It is in such a case that the above-described feature for suspending responses is effective.

Also, in order for the device of the present invention to acquire the EUI-64 information before the connected external devices, there are methods of, for example, acquiring only the low-order portion of the EUI-64 first, performing a rough judgment in a short period of time, and disabling the response suspension for external devices in the order in which their EUI-64 information was acquired.

Also, disabling the response suspension with respect to external devices in the order in which the EUI-64 information thereof was acquired enables avoiding congestion in communication related to the acquisition of the EUI-64 information directly after a bus reset.

The following describes the response switch processing procedure for controlling the above-described operations.

Figure 9:
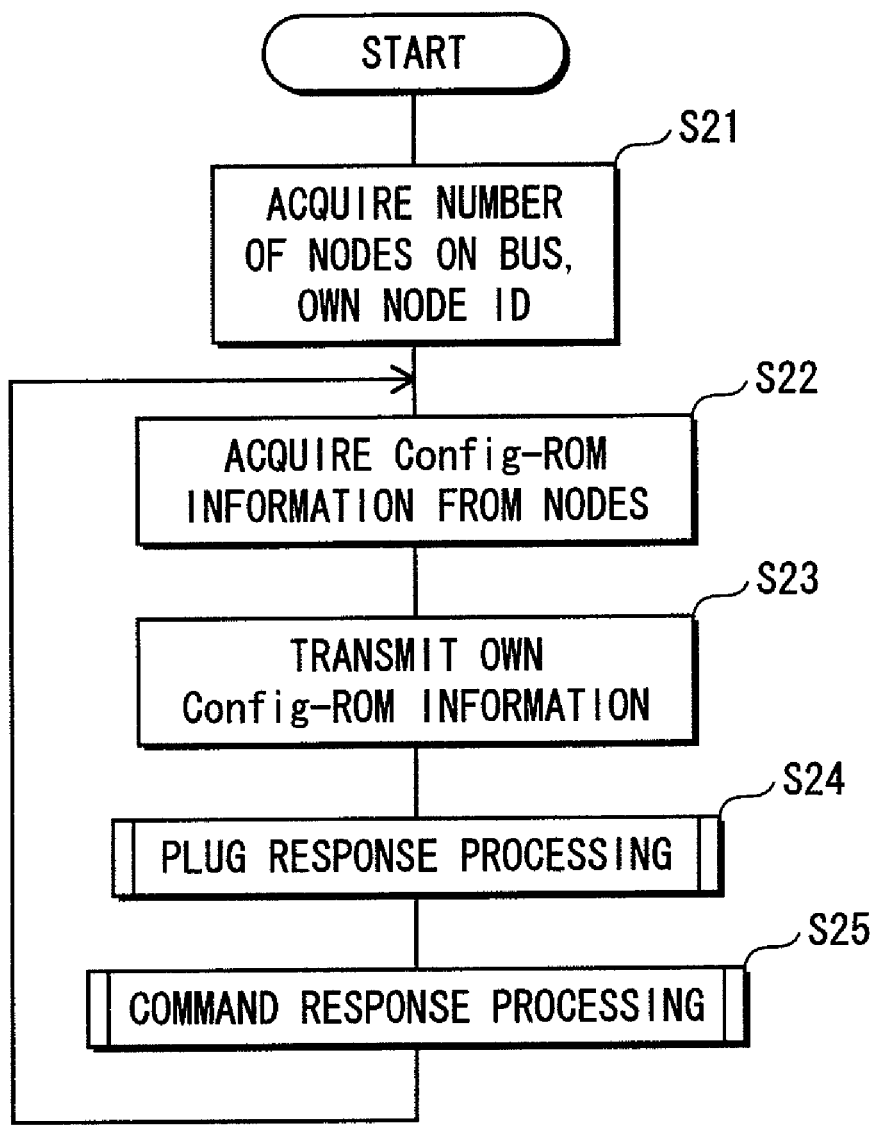
FIG. 9 is a flowchart showing a procedure by which device information pertaining to virtual subunit models is acquired and response processing is performed.

FIG. 9 is a flowchart showing the response switch processing procedure.

The response switch processing is started after the virtual subunit model has been restarted in step S5 of FIG. 5. In step S5 of FIG. 5, there is a bus reset when the data stream transmission/reception device 100 restarts, and after the number of nodes on the bus and the device's own node ID in the Physical Layer has been checked (step S21), the connected external device information acquisition unit 50 issues a readquad transaction to the nodes on the bus to acquire the Config-ROM content (step S22). Upon receiving a readquad transaction from an external device for acquiring the Config-ROM of the data stream transmission/reception device 100, the data stream transmission/reception device 100 transmits a Config-ROM response (step S23).

After acquiring the Config-ROM in step S22, the device group setting unit 51 begins to generate the external device management information table with use of the EUI-64 included in the acquired Config-ROM. Until the generation of the external device management information table has been completed, the response switch command unit 53 transmits the response permission command 190 for prohibiting responses.

While the processing of steps S22 to S25 is being repeated, responses are suspended, based on the response permission command and switch command output by the response switch command unit 53, in the plug response processing of step S24 in response to the plug register control performed by an external device, and in the command response processing of step S25 for responding to the reception of a command from an external device, until the generation of the external device management information table has been completed.

This completes the description of the response switch processing.

The following describes details of the plug response processing performed in step S24 and the command response processing performed in step S25.

Figure 10:
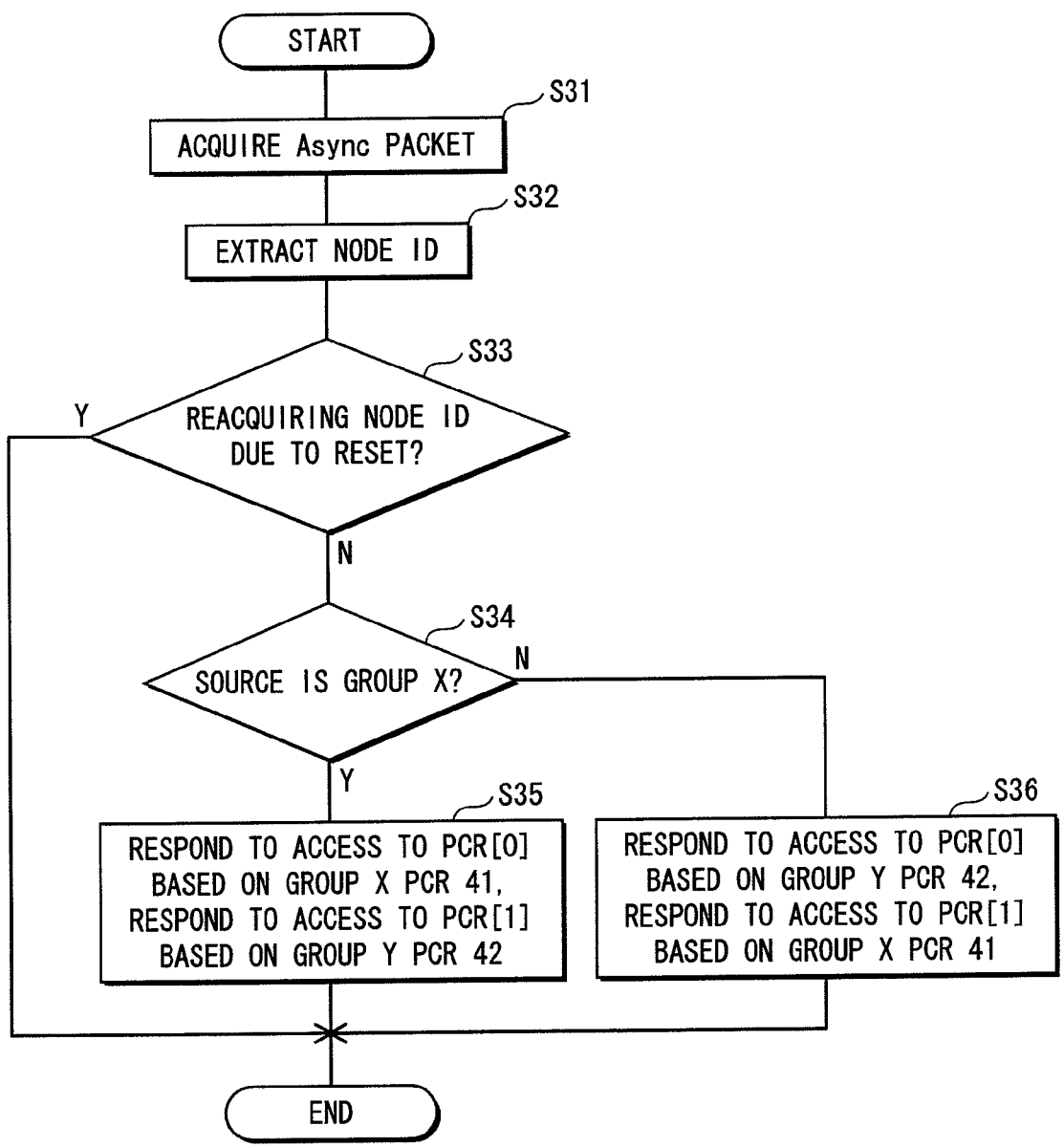
FIG. 10 is a flowchart showing a plug response processing procedure.

FIG. 10 is a flowchart showing the plug response processing procedure.

First, in the plug response processing, when an external device access the oPCR and the iPCR of the device of the present invention, the source extractions unit 52 acquires the Async packet 110 that is the access to the PCRs (step S31), and extracts the node ID from the Async packet 110 (step S32). At this time, if node IDs of all the nodes are currently being re-acquired and the generation of the external device management information table has not been completed (step S33:YES), the response switch command unit 53 transmits the response permission command 190 for prohibiting responses, thereby causing the plug response unit 40 to suspend a response to the access, and ending the command response processing.

However, if it has been determined in step S33 that the re-acquisition of node IDs from all the nodes has finished and the generation of the external device management information table has been completed (step S33:NO), the response permission command 190 for prohibiting responses is disabled, as a result of which the plug response unit 40 transmits a response to the access, based on the switch command sent by the response switch command unit 53.

At this time, since the response switch command unit 53 has referred to the node ID extracted in step S32 and the external device management information table and transmitted a switch command for the group to which the external device that transmitted the Async packet belongs, if the transmission source belongs to group X (step S34:YES), the plug response unit 40 responds to the access to PCR[0] based on the group X PCR 41, and responds to the access to PCR[1] based on the group Y PCR 42 (step S35). On the other hand, if the transmission source belongs to group Y (step S34:NO), the plug response unit 40 responds to the access to the PCR[0] based on the group Y PCR 42, and responds to the access to the PCR[1] based on the group X PCR 41 (step S36).

The above processing enables the plug response unit 40 to return a response corresponding to the group to which a transmission source belongs.

The following describes details of the command response processing.

Figure 11:
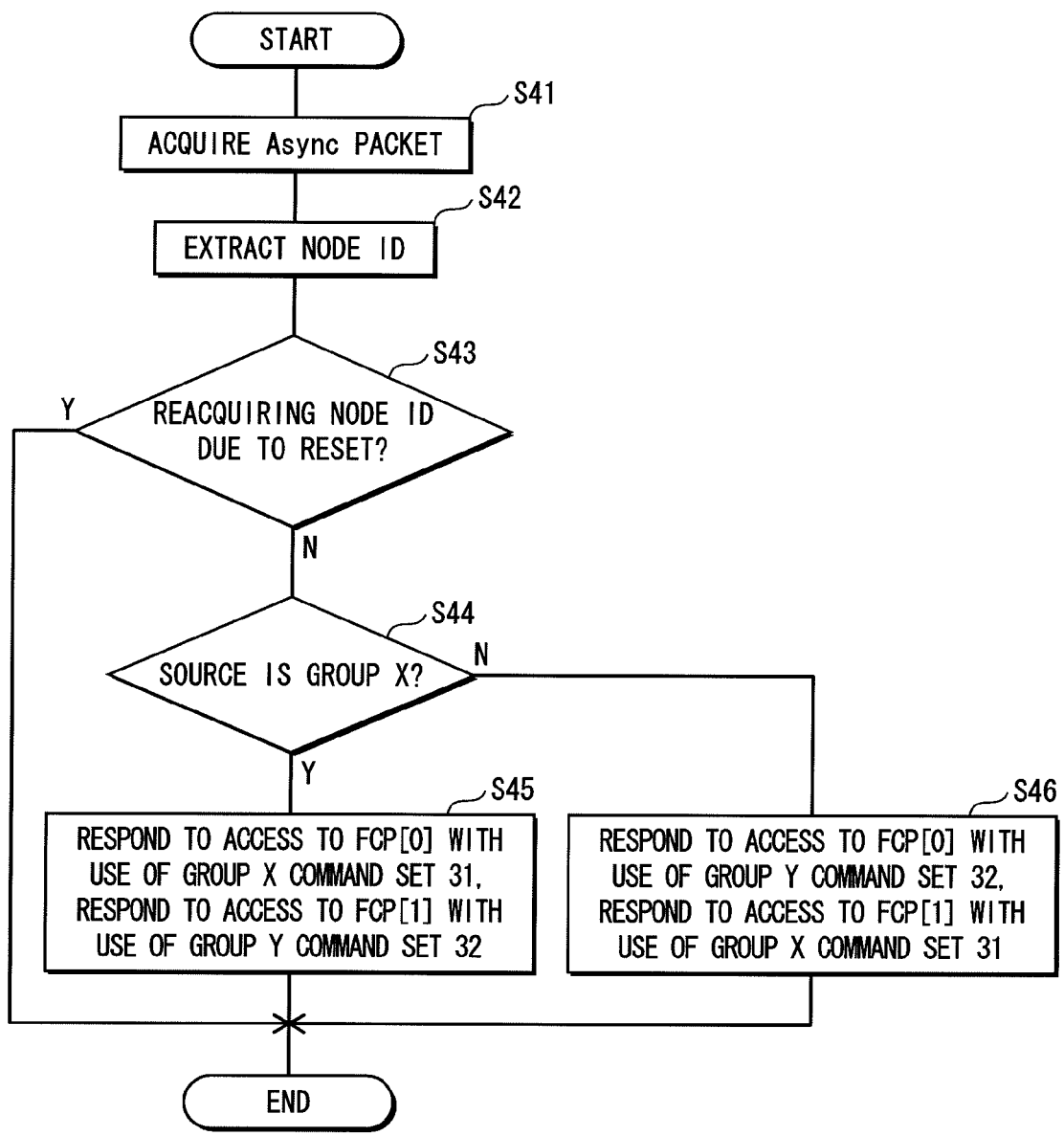
FIG. 11 is a flowchart showing a command response processing procedure.

FIG. 11 is a flowchart showing the command response processing procedure.

The command response processing is performed if an external device accesses the FCP Command registers and the FCP Response registers of the device of the present invention.

In steps S41 to S44 of the procedure, the command response unit 30 performs the same procedure as steps S31 to S34 of the plug response processing shown in FIG. 10, with use of the Async packet 111 that is the access to the FCPs.

The difference between the command response processing and the plug response processing lies in the processing of step S45 that is performed if the transmission source is determined in step S44 to belong to group X, and in the processing of step S46 that is performed if the transmission source is determined in step S44 to belong to group Y.

If the transmission source is determined in step S44 to belong to group X (step S44:YES), the command response unit 30 responds to the access to FCP [0] with use of the group X Command Set 31, and responds to the access to FCP[1] with use of the group Y Command Set 32 (step S45).

If the transmission source is determined in step S44 to belong to group Y (step S44:NO), the command response unit 30 responds to the access to FCP[0] with use of the group Y Command Set 32, and responds to the access to FCP[1] with use of the group X Command Set 31 (step S46).

The above processing enables the command response unit 30 to return a response corresponding to the group to which a transmission source belongs.

Suggestions for Not Breaking the Rules of the Standard

In the IEEE 1394 serial bus, the channel and bandwidth used to transmit a data stream are managed by an IRM (Isochronous Resource Manager). The following should be avoided in order for the management to be performed without breaking the rules of the standard.

(1) A data stream is transmitted without ensuring a channel and bandwidth.

(2) A channel is registered as in-use but does not have a corresponding transmission device, subunit, or plug.

(3) A channel or bandwidth value does not match a value actually set in a plug.

(4) The transmission source of a stream being transmitted does not perform an expected operation.

The above can be avoided by defining a virtual subunit model as shown in the above-described FIG. 8, and including a mechanism for managing connection statuses as shown in FIG. 7.

Methods of Realization While Somewhat Breaking the Operation Rules

Although the method described above follows the operation rules, there is also a method of realization that somewhat breaks the operation rules without any practical issues. The following describes an example of such a method with reference to FIG. 12 and FIG. 13.

Figure 12:
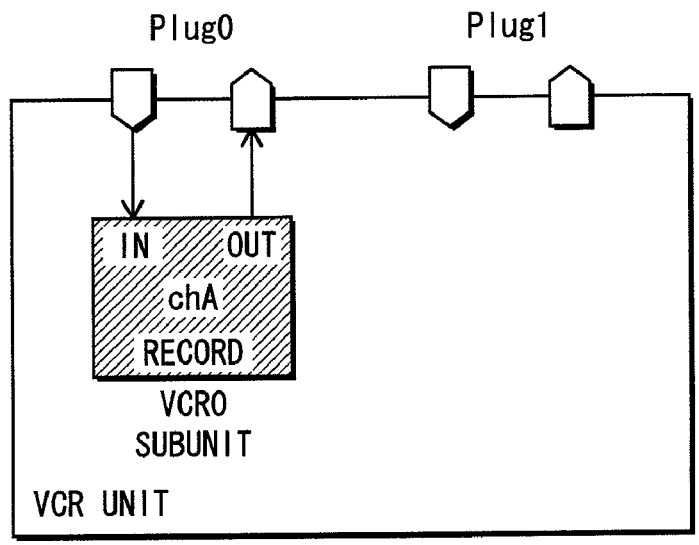
FIG. 12 diagrammatically shows a subunit model pertaining to a modification of embodiment 1.
Figure 12:
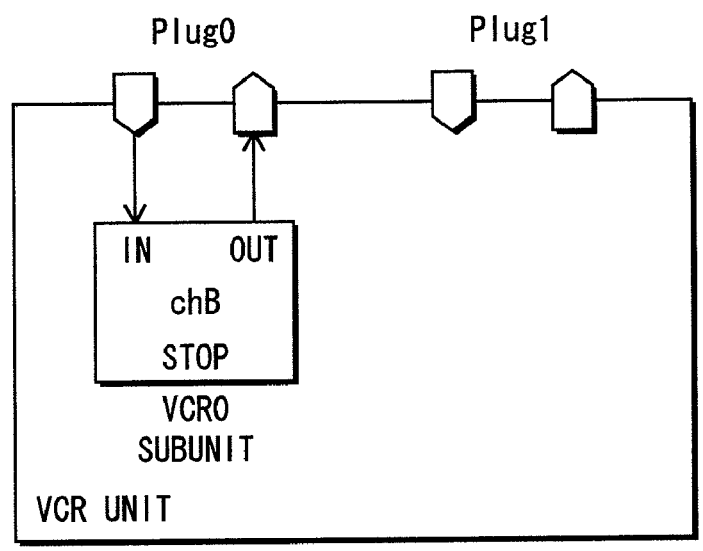

FIG. 12 shows an example of a subunit model that includes only one VCR0 subunit in one unit, and two plugs. The top of FIG. 12 shows the subunit model from the viewpoint of an external device in group X, and the bottom shows the subunit model from the viewpoint of an external device in group Y. As shown in FIG. 12, when a device in group X is using the hardware resource chA, the device issues, for example, a record command to the VCR0 subunit. Although the device in group X can distinguish that the VCR0 subunit has transitioned to a recording status, a device in group Y can only distinguish the status of the hardware resource chB. If the subunit model of FIG. 12 is used, it is not possible for a device in one group to know the operation status for a device in a different group. However, since two plugs are defined in the subunit model, it is possible to properly know the use status of the plugs from the viewpoint of an external device. For example, if performing recording using the VCR0 subunit, the device in group X is connected via Plug0, and from the viewpoint of the device in group Y, the device in group X appears to be connected via Plug1. In other words, the use status of the plugs appears properly in accordance with standards to the external devices via oPCR or iPCR. In this method, it is possible to have a structure in which the use status of a plug can be observed from either group, while hiding the operation status of a hardware resource from a device in the other group.

Figure 13:
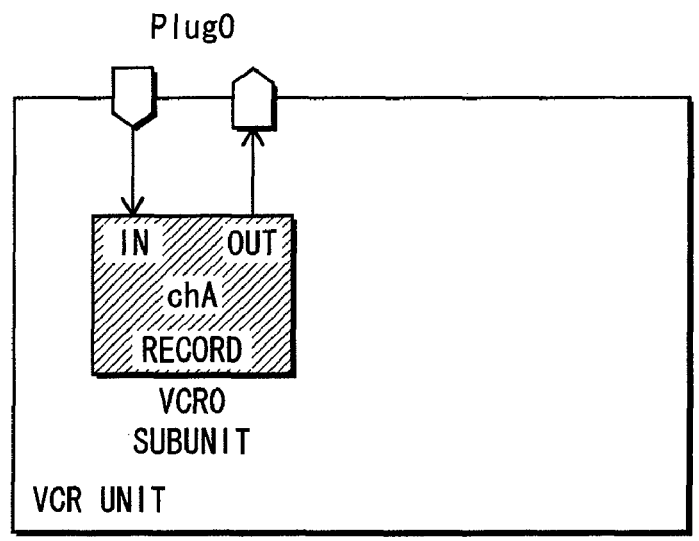
FIG. 13 diagrammatically shows a subunit model pertaining to another modification of embodiment 1.
Figure 13:
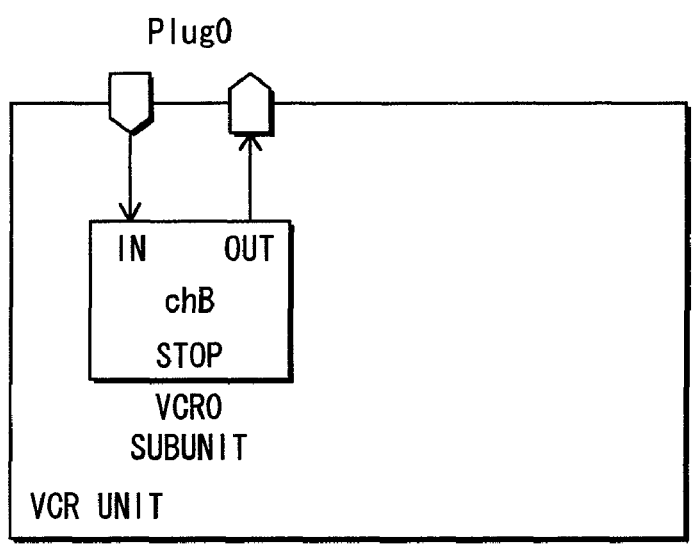

FIG. 13 shows a subunit model in a case of having fewer plugs than in the subunit model of FIG. 12. In this case, there is only one plug and it is only possible to respond to a connection from one group. Accordingly, even if for example a device in group X is performing recording, a device in group Y cannot know the connection status.

A device in group Y cannot observe the connection being used by the device in group X even if oPCR and iPCR are referenced. Therefore, while chA is in a recording status, the device in group Y can only see that there has been a sudden reduction in the bus bandwidth. Such a subunit model can be used in practice as long as the connected external devices do not distinguish such an operation status as abnormal. However, this use is not preferable from the viewpoint of IEEE 1394 serial bus standards.

Using Two of the Same Subunit

Figure 14:
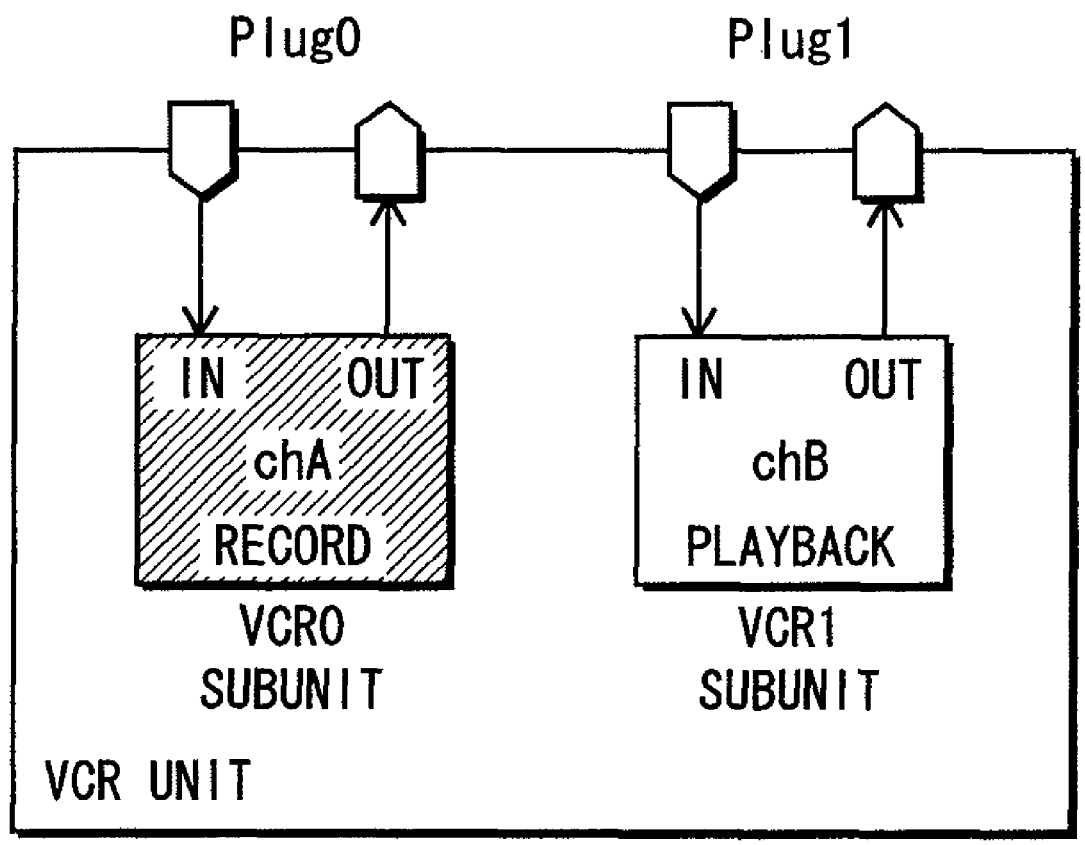
FIG. 14 diagrammatically shows a subunit model pertaining to yet another modification of embodiment 1.

In the subunit model of FIG. 11, a SubunitInfo command from an external device is responded to by disclosing the Vendor0 subunit as the subunit connected to the second plug (Plug1). However, another subunit may be used. For example the SubunitInfo command may be responded to by disclosing a subunit model in which the Vendor0 subunit is the VCR1 subunit, thereby having two of the same type of subunit. FIG. 14 shows an example of a subunit model provided in such a case. When a new device that has two plugs and uses the technology disclosed in patent document 1 is connected as an external device, recording is possible from not only the first plug (Plug0) but also the second plug (Plug1) at the same time, even if the new device that can handle a plurality of streams is in the same group as the other external device.

However, when such a structure is used, the use of the second plug by a device in group X and the use of the first plug by a device in group Y becomes burdensome, which may lead to a failure in scheduled recording or the like.

In order to avoid such an issue, it is desirable to use a method in which group X is not permitted to use the second plug. One example of a method for prohibiting the use of the VCR1 subunit connected to the second plug is, upon receiving a command indicating recording etc., transmitting a response indicating that a tape has not been inserted (a No Tape response). However, the issue of use by different groups becoming burdensome does not arise in the subunit model of FIG. 11 since the Vendor0 subunit is assigned. This is because vendor-type subunits have functions that are independently defined by manufacturers, and an external device would therefore not issue a command to the Vendor0 subunit whose functions are unclear.

Another method of resolving the above-described issue involves expanding the hardware resources from 2-channel compatibility to 3-channel compatibility, and adding an additional plug.

In this way, transmitting an appropriate response from the subunit assigned to the second plug enables resolving the issue of use by different groups becoming burdensome and avoiding issues such as schedule recording failures etc., not only when an older external device that is compatible with only one plug is connected, but also when a new external device that uses the technology disclosed in patent document 1 and can handle a plurality of streams is connected.

Using Different Subunits

Figure 15:
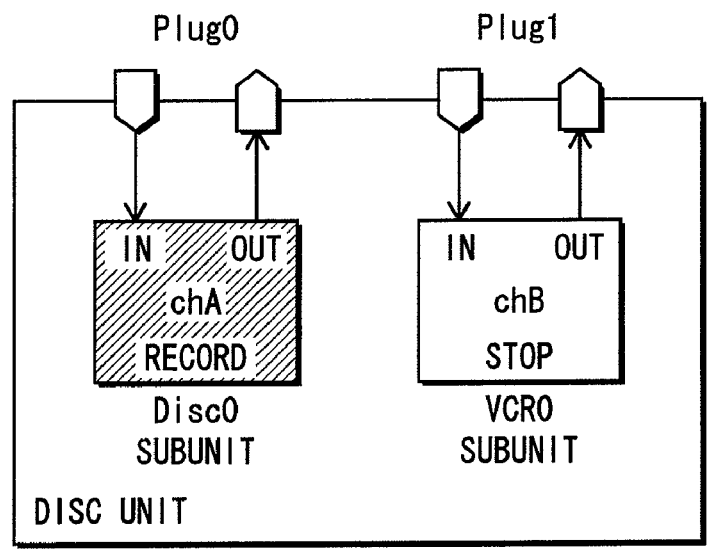
FIG. 15 diagrammatically shows a subunit model pertaining to yet another modification of embodiment 1.
Figure 15:
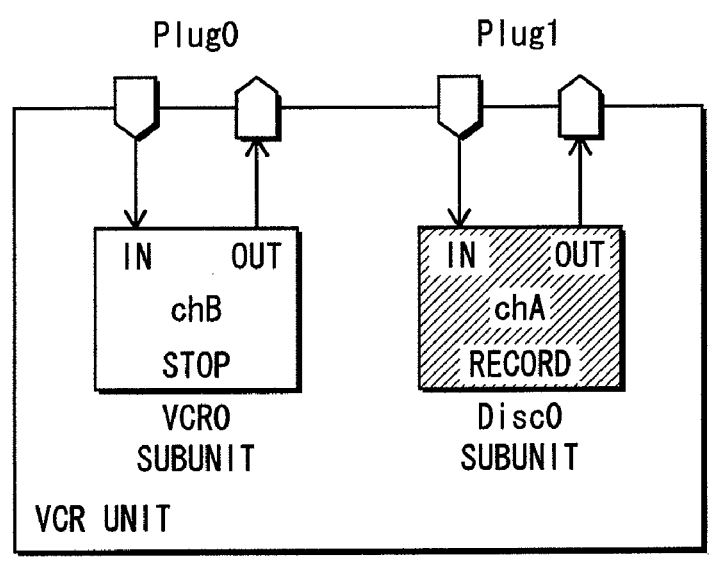

In the exemplary subunit model shown in FIG. 15, the subunit connected to the first plug (Plug0) is the Disc0 subunit, and the subunit connected to the second plug (Plug1) is the VCR0 subunit. Here the Disc0 subunit may be assigned to group X, and the VCR0 subunit may be assigned to group Y. If the conventional external devices are a device that can only control a VCR device and a device that can only control a Disc device, such devices can be divided in appropriate groups, and operate independently at the same time.

The subunit model shown in FIG. 15 has, similarly to the above-described example of using two of the same type of subunit, the issue of the use by different groups at the same time becoming burdensome. One method of resolving this issue involves, when a device in group X issues a command to the VCR0 subunit connected to the second plug, transmitting a No Tape response similarly to the case described above, and when a device in group Y issues a command to the Disc0 subunit connected to the second plug, transmitting, for example, Unknown as the command response to indicate an unknown command. This enables notifying the prohibition of use, and resolving the issue of use by different groups at the same time becoming burdensome.

A total of five types of subunit models have been described in embodiment 1, namely the subunit model of FIG. 8, the subunit model of FIG. 14 that has the same subunits as FIG. 8, and the subunit models of FIG. 12, FIG. 13, and FIG. 15. Although the subunit model of FIG. 8 is the most preferable due to adhering to the standards, the other subunit models also enable resolving the above-described issues. Also, the subunit model is not limited to the five types described above. The same effects can be obtained even if, for example, the type of the subunits is changed so as to define another type set in the standards.

Reason for not Including a Plurality of Config-ROMs

The structure described in embodiment 1 allows for the provision of a plurality of Config-ROMs, and a method in which different Config-ROMs are switched according to the groups. However, such a method is not used in embodiment 1, and the reason for this is described below.

Here, let us assume that existing on the IEEE 1394 are the data stream transmission/reception device 100 of the present embodiment, as well as two devices that switch Config-ROM responses. The following problem occurs when two such devices exist and a bus reset occurs.

In the device of the present embodiment, the EUI-64 information included in the Config-ROM is important information for re-checking the correspondence between the node IDs and EUI-64s when there has been a bus reset. However, a device that switches the Config-ROM response according to groups first specifies the group to which another device belongs with use of the Config-ROM information acquired from the other device, and thereafter switches the Config-ROM response appropriately for the group. Therefore, assuming that there are two or more devices that have a plurality of Config-ROM responses, the transmission of Config-ROM responses from both of the devices would be suspended, and the acquisition of the EUI-64 would never be completed. In order to avoid this problem, there is only a single Config-ROM response even when there are different groups, and therefore no switching of Config-ROM responses is performed.

Modifications of Embodiment 1

The following modifications have basically the same structure as in embodiment 1, with the exception of minor differences.

(1) Although the data stream transmission/reception device 100 starts with a fixed subunit model during initial startup in embodiment 1, the data stream transmission/reception device may register all external devices in group X during initial startup or in a default status before performing grouping setting.

Such a structure eliminates the need for a function for disclosing the fixed subunit model, and enables the device to have only a function for disclosing the virtual subunit model.

(2) In embodiment 1, the data stream transmission/reception device 100 causes a GUI image to be displayed on a node having a display function on the IEEE 1394 serial bus in order to receive a user operation for instructing the grouping of external devices. However, the user operation for grouping external devices may be received by another method.

For example, the data stream transmission/reception device may be provided with an LCD screen, and the GUI image may be displayed on the LCD screen. In another example, the data stream transmission/reception device and the remote controller may be provided with an infrared communication function in accordance with IrDA standards, and the data stream transmission/reception device may transmit the external device management information table to the remote controller by infrared communication. The user may then look at the display on the LCD or other screen on the remote control and performing grouping, and the result of the grouping may be transmitted to the data stream transmission/reception device by infrared communication.

Embodiment 2

In the case of using the subunit model shown in FIG. 15 in embodiment 1, the same EUI-64 is disclosed regardless of the group. This is to avoid the following problem. When there are two devices that switch Config-ROM responses according to the groups on the IEEE 1394 serial bus, both of the devices suspend the transmission of their Config-ROM responses when acquiring the Config-ROM information after a bus reset, and processing stalls.

However, if different virtual subunit models are disclosed to different groups such as in FIG. 15, and if, for example, the same EUI-64 is used for all of the virtual subunit models, given that the other device checks for a subunit model for each EUI-64, even if the virtual subunit model is switched from VCR to Disc, the other device will continue to manage the device as a VCR device. In other words, assigning different EUI-64s to the virtual subunit model that receives a connection to the Disc subunit via the first plug and the virtual subunit model that receives a connection to the VCR subunit via the first plug has the advantage of eliminating problems in device recognition in the device that is to be connected.

The following description in embodiment 2 pertains to a device that includes the subunit model of FIG. 15 and switches Config-ROM responses according to the group of the connection device, while avoiding the problem of processing stalling if there another of the same type of device on the IEEE 1394 serial bus.

Figure 16:
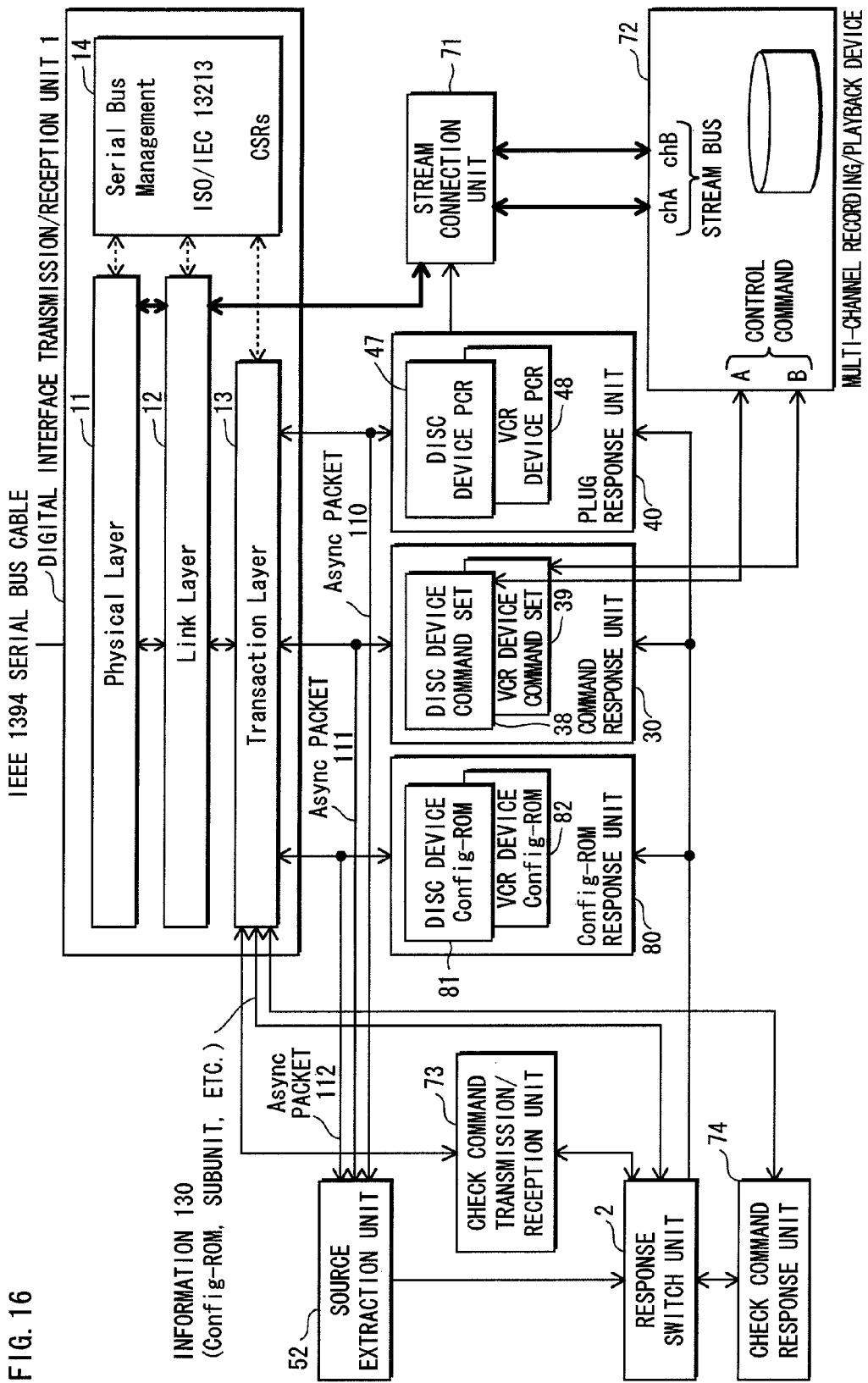
FIG. 16 shows the internal structure of a data stream transmission/reception device 100 of embodiment 2.

FIG. 16 shows the internal structure of the data stream transmission reception device 100 pertaining to embodiment 2. The structure shown in FIG. 16 includes the structure of embodiment 1 shown in FIG. 2, with the addition of a check command transmission/reception unit 73 and a check command response unit 74. Also, due to the addition of the above two constituent elements, the Config-ROM response unit 80 manages the Config-ROMs instead of the Serial Bus Management 14. The following describes the new constituent elements and improvements.

Note that in embodiment 2, a virtual subunit model in which the Disc subunit has been assigned to the first plug is disclosed to group X, and a virtual subunit model in which the VCR subunit has been assigned to the first plug is disclosed to group Y. Also, group X is referred to as the Disc group, and group Y is referred to as the VCR group.

Improvements to the Response Switch Unit 2 in Embodiment 2

The response switch unit 2 specifies a node for whom information acquisition has not been completed due to the node not responding to a readquad transaction requesting the Config-ROM, and notifies the specified node to the check command transmission/reception unit 73.

Check Command Transmission/Reception Unit 73

The check command transmission/reception unit 73 issues a virtual subunit model response check command to the node that has not notified its Config-ROM, and receives, as a response, the external device management information table held by the external device that is the response source. The virtual subunit model response check command is a command unique to devices that are the same type as the device of the present embodiment, or in other words, devices having a function of disclosing virtual subunit models having different structures to different groups. For each external device that discloses virtual subunit models having different structures to different groups, the virtual subunit model response check command requests the other device to notify what type of virtual subunit model should be disclosed. Therefore, if the device that responds to the virtual subunit model response check command has a function of disclosing virtual subunit models having different structures to different groups, it is possible to, based on the response, to know which virtual subunit model to disclose to the other device. The content of the external device management information table received from the other external device is notified to the response switch unit 2.

Check Command Response Unit 74

Upon reception of a virtual subunit model response check command from an external device, the check command response unit 74 transmits the internally stored external device management information table to the transmission source as a command response.

Config-ROM Response Unit 80

The Config-ROM response unit 80 includes two Config-ROMs, namely a disc device Config-ROM 81 and a VCR device Config-ROM 82. If a reaquad transaction requesting an internally stored Config-ROM is received, the Config-ROM response unit 80 transmits the content of the disc device Config-ROM 81 if the issuer of the readquad transaction is an external device in the Disc group, and transmits the content of the VCR device Config-ROM 82 if the issuer of the readquad transaction is an external device in the VCR group. Given that different EUI-64 values are set in the disc device Config-ROM 81 and the VCR device Config-ROM 82, the Config-ROM response unit 80 functions as a device ID number notification unit that notifies a different EUI-64 for different groups by transmitting either the disc device Config-ROM 81 or the VCR device Config-ROM 82.

This completes the description of the internal structure of the data stream transmission/reception device 100 pertaining to embodiment 2.

The following describes characteristic operations performed by the data stream transmission/reception device 100 pertaining to embodiment 2.

Figure 17:
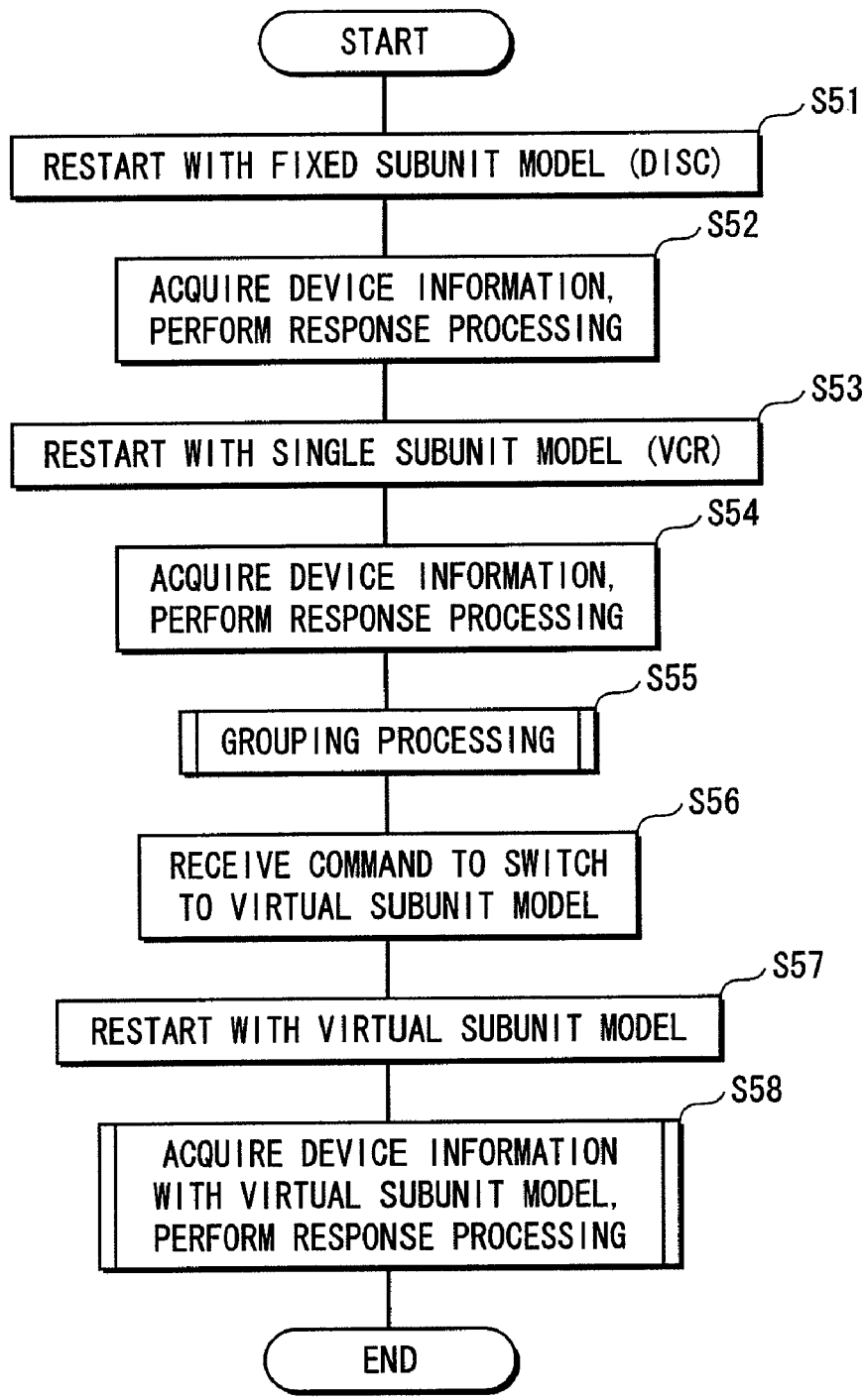
FIG. 17 shows a flow of operations performed by the data stream transmission/reception device 100 of embodiment 2.

FIG. 17 is a flowchart showing a flow of operations performed by the data stream transmission/reception device 100 pertaining to embodiment 2. The operation flow shown in FIG. 17 is different from the operations shown in FIG. 5 of embodiment 1 with respect to the procedure of steps S51 to step S54 before grouping settings are received from the user.

In embodiment 1, a display showing a list of devices is created and presented to the user to aid in the user operation for setting groupings. The list display is created in steps S1 and S2 of FIG. 5, in which the device is started with a fixed subunit model, and the list is created based on the device information acquired from the nodes.

However, in embodiment 2, the type of the subunit that receives a connection via Plug0 differs according to the groups, and if the user is not aware whether a certain external device is compatible with disc operation commands or VCR operation commands, forcing the user to select whether to disclose a disc model or a VCR model may lead to erroneous settings in which, for example, an STB that only supports VCR commands is registered in the disc group.

Therefore, in steps S51 to S54 in the operation flow shown in FIG. 17 of embodiment 2, during initial startup the device is started with a fixed subunit model in which Plug0 has been assigned to the disc subunit, device information is exchanged with the external device (step S51 and step S52), and then the device restarts with a fixed subunit model in which Plug0 has been assigned to the VCR subunit, and device information is exchanged with the external device (step S53 and step S54). This procedure enables distinguishing whether or not the transmission-source node is a device compatible with disc commands, based on the SubUnit command received when starting up with a fixed subunit model as a disc device, and distinguishing whether or not the transmission-source node is a device compatible with VCR commands, based on the SubUnit command received when starting up with a fixed subunit model as a VCR device.

Figure 18:
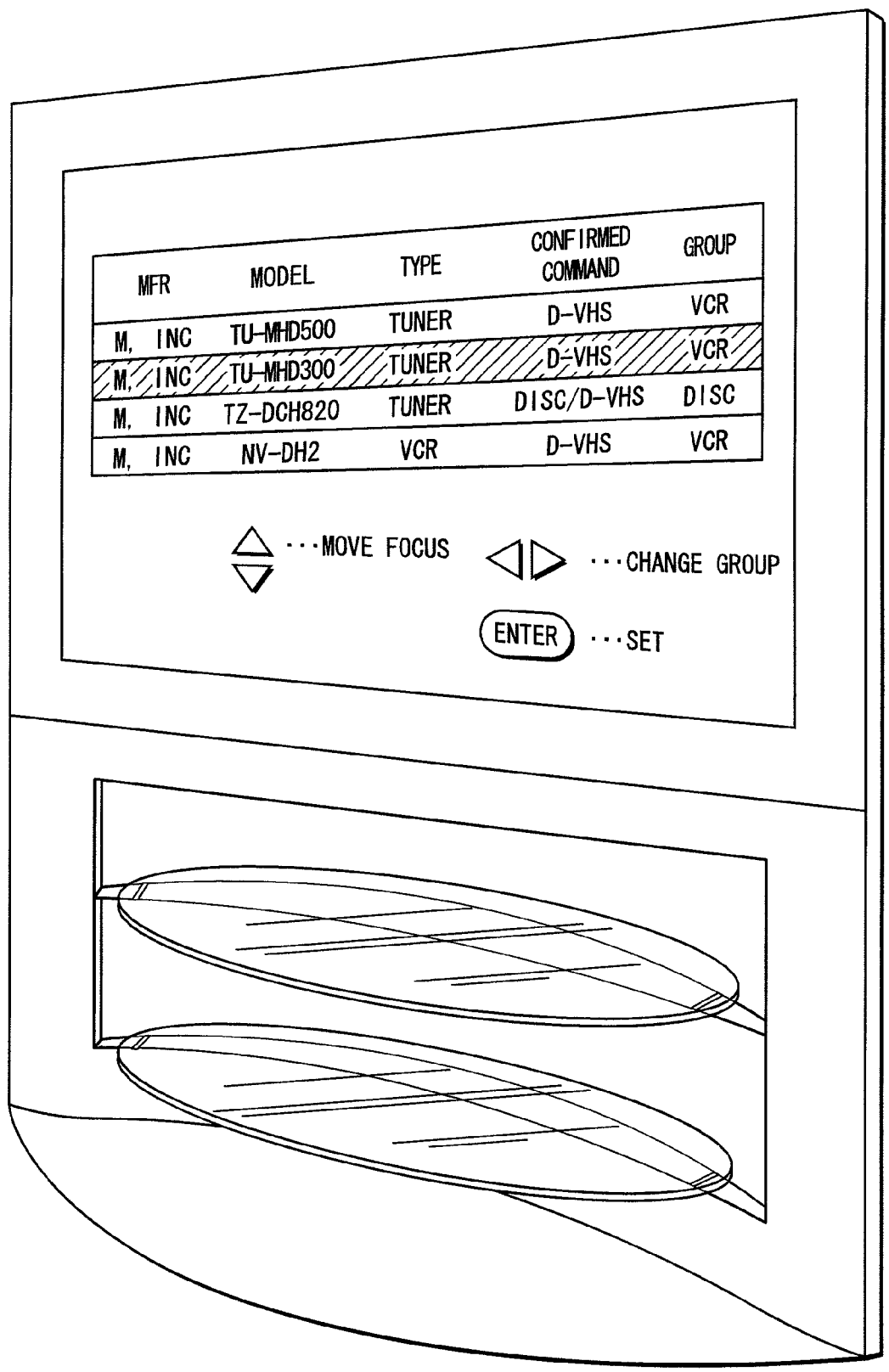
FIG. 18 shows an exemplary GUI display for receiving a grouping operation in embodiment 2.

The obtained information regarding the command support of the nodes is recorded in the external device management information table as response commands, and when requesting the user in step S55 to select a group, displaying the command supported by the device on the GUI as shown in FIG. 18 alerts the user to avoid putting an external device into a group pertaining to unsupported commands. Also, if the user that is performing operations on the GUI screen puts a node into a group pertaining to unsupported commands, a warning message can be output to further alert the user.

The following describes the details of the Config-ROM information acquisition processing and Config-ROM information response processing of embodiment 2.

Figure 19:
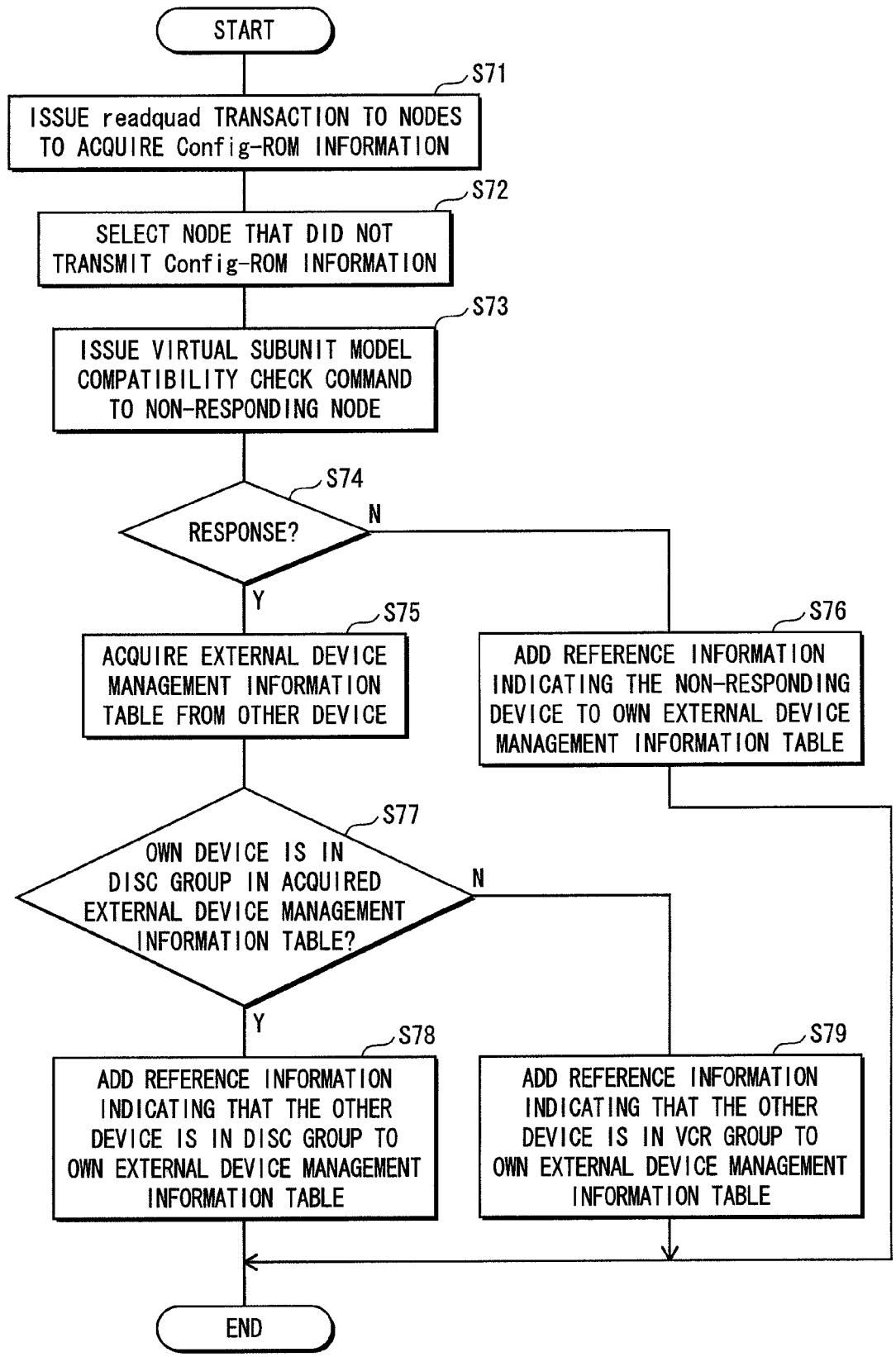
FIG. 19 is a flowchart showing a Config-ROM information acquisition processing procedure.

FIG. 19 is a flowchart showing the Config-Rom information acquisition processing procedure. This processing is executed when the data stream transmission/reception device 100 is connected to the IEEE 1394 serial bus, power supply is initiated, or there has been a bus reset.

First, in the Config-Rom information acquisition processing, the connected external device information acquisition unit 50 in the response switch unit 2 issues a readquad transaction to the nodes and attempts to acquire the Config-ROM information of the nodes. EUI-64s are extracted from the acquired Config-ROM information and an external device management information table is generated (step S71).

However, Config-ROM such as described above is not received from a device that, similarly to the data stream transmission/reception device 100, discloses different virtual subunit models to different groups. The external device information acquisition unit 50 specifies the node with whom information acquisition was not completed due to not receiving a response, and notifies the specified node to the check command transmission/reception unit 73 (step S72).

The check command transmission/reception unit 73 issues a virtual subunit model response check command to the node that did not respond (step S73), and checks whether a response is received (step S74). A response to the virtual subunit model response check command is received only from devices that disclose different virtual subunit models to different groups, and if a response is not received (step S74:NO), the other device is thought to be an non-responding device such as a hub. In such a case, reference information indicating the non-responding device is added to the external device management information table in the device group setting unit 51 (step S76), and Config-ROM information acquisition processing is ended.

If a response to the virtual subunit model response check command is received (step S74:YES), given that the response includes the external device management information table held by the other device, the check command transmission/reception unit 73 records the acquired external device management information table to the work memory (step S75).

The check command transmission/reception unit 73 further checks whether the data stream transmission/reception device 100 is grouped in the disc group or VCR group in the external device management information table of the other device (step S77), and notifies the result to the device group setting unit 51.

The device group setting unit 51 adds, to the external device management information table, reference information specifying that the other device belongs to the same group as the group to which the data stream transmission/reception device 100 belongs in the external device management information of the other device (step S78 or step S79). This completes the description of the details of the Config-ROM information acquisition processing.

Note that the reference information added to the external device management information table in the Config-ROM information acquisition processing is used in the selection of groupings by the user. Since commands are neither transmitted to nor received from a device whose reference information indicates a non-responding device, such a device is managed as being incompatible with both the disc group and the VCR group, and is removed from the node list when creating the GUI for group selection.

If the same type of device as the data stream transmission/reception device 100, and whose reference information has been added based on the response to the virtual subunit model response check command, is set to a different group than the group registered in the device, the subunit model device disclosed by the data stream transmission/reception device 100 will not appear to exist. This leads to problems such as not being able to receive a dubbing operation from the other device. For this reason, a warning message may be output on the GUI when prompting the user for group settings, if, for example, the user tries to register the device in a group that differs from the group specified in the reference information. Alternatively, a recommended group setting may be shown on the selection GUI.

This completes the description of details of the Config-ROM information acquisition processing in embodiment 2.

The following describes the details of the Config-ROM information response processing.

Figure 20:
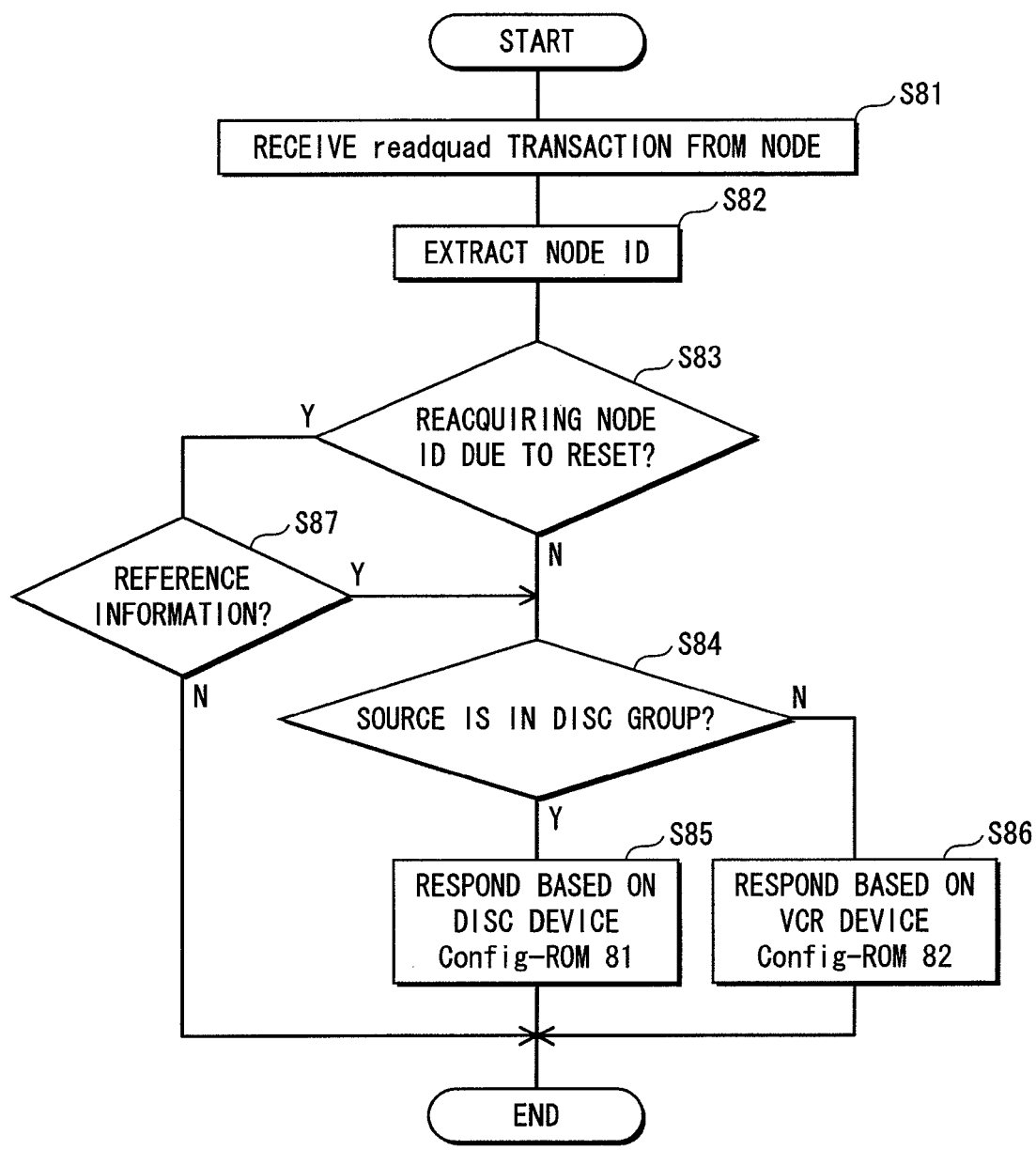
FIG. 20 is a flowchart showing a Config-ROM information response processing procedure in embodiment 2.

FIG. 20 is a flowchart showing the Config-Rom information response processing procedure.

First, in the Config-ROM information response processing, upon receiving, from an external device, a readquad transaction requesting Config-ROM information (step S81), the source extraction unit 52 extracts the node ID from the Async packet 112 (step S82). If node ID re-acquisition is being performed for all of the nodes on the bus and the generation of the external device management information table has not been completed (step S83:YES), the response switch command unit 53 transmits a response permission command that prohibits response transmission, and therefore the Config-ROM response unit 80 suspends the transmission of the Config-ROM information, and command response processing ends. However, if reference information pertaining to a virtual subunit model response check command exists in the external device management information table in correspondence with the transmission-source node (step S87), processing continues from step S84 with the assumption that the transmission-source node belongs to the group indicated by the reference information.

In step S84, the response switch command unit 53 references the node ID extracted in step S82, the external device management information table and the reference information, and transmits a command for switching to the group to which the node that transmitted the Async packet 112 belongs. If the transmission-source node belongs to the disc group (step S84:YES), the Config-ROM response unit 80 transmits a response based on the disc device Config-ROM 81. On the other hand, if the transmission-source node belongs to the VCR group (step S84:NO), the Config-ROM response unit 80 transmits a response based on the VCR device Config-ROM 82. This completes the description of the details of the Config-ROM information response processing pertaining to embodiment 2.

The above-described Config-ROM information acquisition processing and Config-ROM information response processing enables two of the same type of device on the IEEE 1394 serial bus, each of which switches the Config-ROM response according to the group of the connected device, to acquire Config-ROM information from each other.

Note that the external device management information table held by the data stream transmission/reception device 100 is updated when virtual subunit model response check commands are exchanged after a bus reset has occurred. Also, if the number of devices registered in the external device management information tables increases and exceeds a limit of registered devices that can be managed, registrations from devices that do not exist at that time may be automatically erased.

Modifications of Embodiment 2

The following modifications have basically the same structure as in embodiment 2, with the exception of minor differences.

(1) Rather than requesting the user to assign subunit models, the data stream transmission/reception device of the present invention may automatically assign an external device to group in accordance with a command supported by the external device. Specifically, after checking the commands supported by the external devices in steps S51 to S54 of FIG. 17, the device group setting unit 51 may register devices compatible with disc commands in the disc group, and register all other devices in the VCR group.

(2) External devices may be divided into groups according to preset rules, rather than with use of a GUI.

Specifically, in a case in which a device such as a digital set-top box and the data stream transmission/reception device of the present invention are sold together as a pair, where the former is the master device and the latter is the slave device, the need for the user to perform grouping is eliminated if, before shipping, the master device is registered in group X in the data stream transmission/reception device, and a rule is set such that all other master devices are registered in group Y. In this example, methods used by the data stream transmission/reception device to distinguish the master device include referencing a specified bit of the EUI-64 included in the Config-ROM and referencing code etc. indicating rules for each Vendor, referencing the model of the master device, and the like.

Embodiment 3

Figure 21:
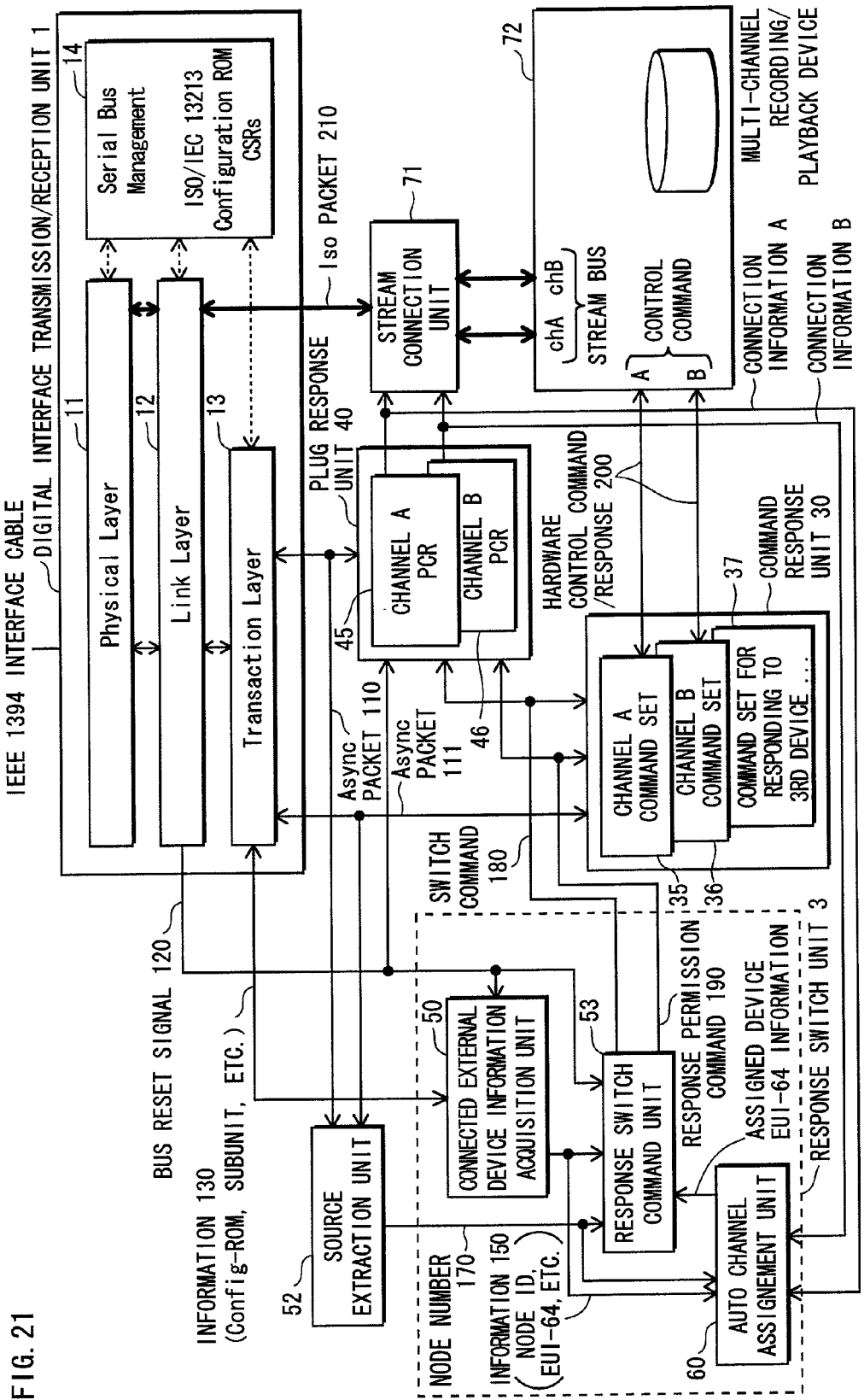
FIG. 21 shows the internal structure of a data stream transmission/reception device 100 of embodiment 3.

FIG. 21 shows the structure of a data stream transmission/reception device pertaining to embodiment 3 of the present invention. As shown in FIG. 21, the data stream transmission/reception device 100 includes a digital interface transmission/reception unit 1, a response switch unit 3, a command response unit 30, a plug response unit 40, a source extraction unit 52, a stream connection unit 71, and a multi-channel recording/playback device 72. A description of internal structures other than the response switch unit 3 has been omitted due to being the same as in FIG. 1 of embodiment 1.

In embodiment 1, the internal structure of the response switch unit 3 is based on group settings manually performed by the user. In embodiment 2, however, devices are assigned to groups automatically, rather than manually.

The response switch unit 3 includes a connected external device information acquisition unit 50, an auto channel assignment unit 60, and a response switch command unit 53. The response switch unit 3 differs from the response switch unit 2 shown in FIG. 1 with respect to the auto channel assignment unit 60, the operations of which are described below.

Precondition

In the case of embodiment 3, the following precondition is necessary for the subunit model to be disclosed to an external device.

The condition is that, if use has not begun, the data stream transmission/reception device 100 discloses the same type of available subunit to all external devices.

This condition is necessary because whereas grouping is performed manually by a user in advance in embodiment 1, grouping is not performed in advance in embodiment 3. In other words, since grouping is not performed in advance, it is necessary to show the same type of available subunit to all external devices if use has not begun. This is because if, for example, an external device accesses the device 100 as a VCR device, and in another instance of access, the device 100 responds as a disc device, the external device will no longer understand the type of the subunit model, and will not be able to appropriately issue a record command etc.

Operations of the Auto Assignment Function

Figure 22:
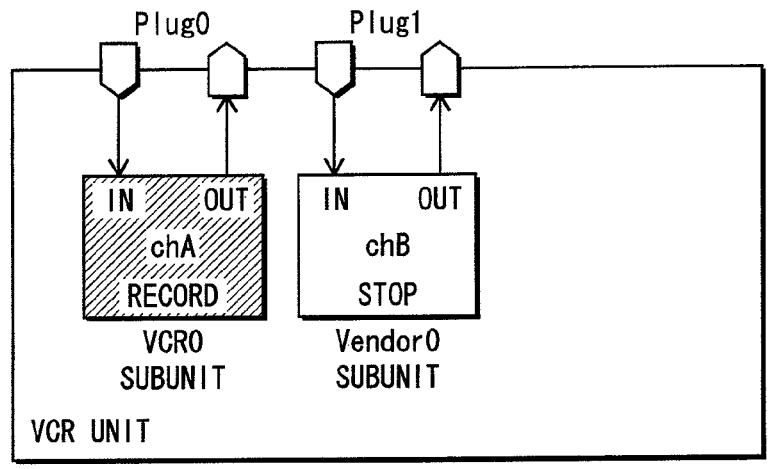
FIG. 22 diagrammatically shows a subunit model of the data stream transmission/reception device 100 of embodiment 3.
Figure 22:
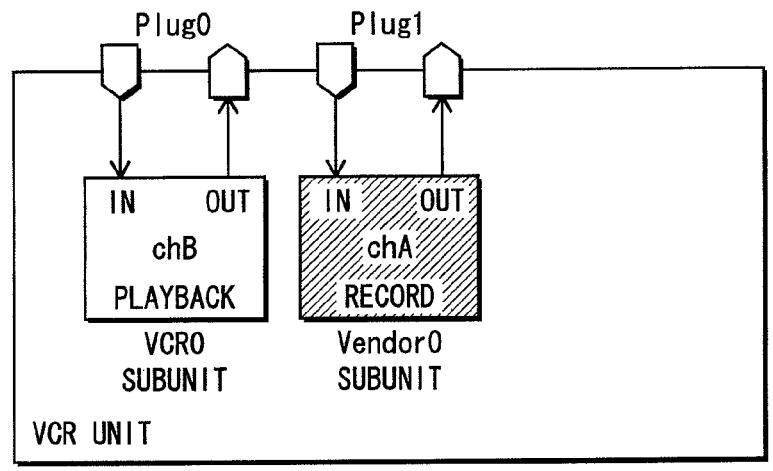
Figure 22:
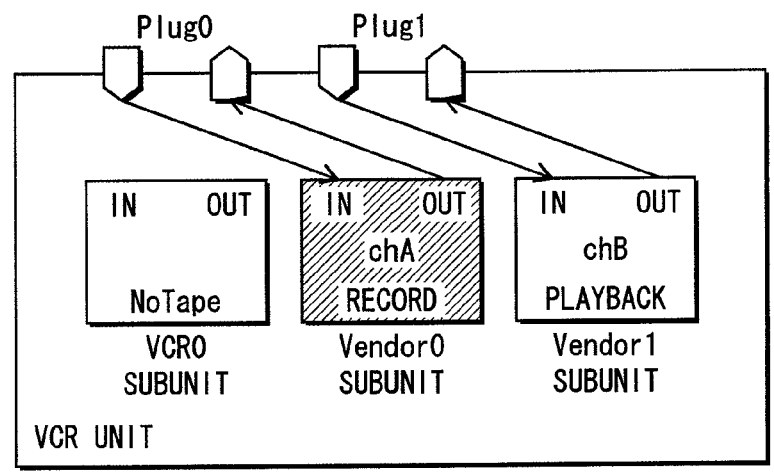

In embodiment 3, the subunit model is defined as shown in FIG. 22. First, the subunit model appears as shown at the top of FIG. 22 when viewed by a first device, appears as shown in the middle of FIG. 22 when viewed by a second device, and appears as shown at the bottom of FIG. 22 when viewed by a third device (corresponding respectively to the channel A command set 35, channel B command set 36, and command set for responding to 3rd device . . . 37 shown in FIG. 21). In FIG. 22, the VCR0 subunit appears as an available subunit when viewed by the first and second devices.

When a subunit model check command is issued from the first external device to the device 100, the device 100 discloses the subunit model shown at the top of FIG. 11. This check processing is executed by the command response unit 30 shown in FIG. 10. The first external device that checked the subunit model of the device 100 then performs processing for connecting to the first plug (Plug0) in order to use the VCR0 subunit. This connection processing is performed by a register access to the plug response unit 40 in the same way as in the previous embodiments. The connection with the first external device is notified to the auto channel assignment unit 60 with the use of connection information A. The auto channel assignment unit 60 acquires, with use of the source extraction unit 52, the node ID of the external device that accessed the oPCR and iPCR, and manages the corresponding external device as the first connected device. Also, the node ID and the EUI-64 are managed in correspondence in case of a bus reset such as described in the previous embodiments. Upon receiving an Async packet, the response switch command unit 53 references the external device EUI-64 information of the first device, which was assigned by the auto channel assignment unit 60, and compares the node number 170 from the source extraction unit 52 and EUI-64 of the automatically assigned external device. If the external device is judged to be the first external device, the response switch command unit 53 issues a switch command 180 to the command response unit 30 and the plug response unit 40. Upon receiving the switch command 180, the command response unit 30 and the plug response unit 40 disclose the subunit model shown at the top of FIG. 22.

In a similar way, when a second device establishes a connection, the auto channel assignment unit 60 references connection information B and assigns the second device as the second external device. Thereafter, the response switch command unit 53, the command response unit 30, and the plug response unit 40 perform the same operations as described above, and the subunit model shown in the middle of FIG. 22 is disclosed to the second external device.

Furthermore, when a third device establishes a connection, the auto channel assignment unit 60 references the connection information A and B, and the subunit model shown at the bottom of FIG. 22 is disclosed to the third external device.

If, for example, the operation status of the subunit from the viewpoint of the first or second external device transitions from a playback status to a stop status and the connection status is freed up, the auto channel assignment unit 60 views such a subunit as available, and assigns the subunit to the next external device that establishes a connection.

According to the above operations, hardware resources are successively and automatically assigned. The inclusion of a function for automatically assigning hardware resources enables obtaining the effects of the present invention without having the user manually perform settings.

Other Modifications

Note that although described based on the above embodiments, the present invention is of course not limited to such embodiments. The following modifications are also included in the present invention.

(1) The present invention may be the methods shown in the above-described flowcharts. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(2) The data stream transmission/reception device pertaining to the present invention is not limited to a device that records/plays back a data stream, but rather can be applied to a device that includes other types of subunits.

Although the multi-channel recording/playback device 72 is described as the hardware resource in embodiments 1 to 3, the hardware resource may be a device other than a recording/playback device. Also, hardware resources may be assigned independently to the groups or shared by the groups. In the latter case, it is possible for recording to be performed by a device in one group, while the recorded stream is successively played back by a device from another group at the same time.

Also, although there are two plugs in embodiments 1 to 3, the present invention can operate in the same way if there are three or more plugs.

(3) In embodiments 1 to 3, the source extraction unit acquires the same content as the Async packet received by the command response unit and the plug response unit, analyzes the acquired content, refers to the preset external device management information table, judges whether a response has been received, and outputs a response permission command or a response switch command to the command and plug response units. However, as is obvious based on the theory of a general signal flow graph, in the data stream transmission/reception device, the functions of the source extraction unit may be performed in the command and plug response units, which may refer to the external device management information table and generate responses.

Also, the source extraction unit may be provided upstream of the command and plug response units, and the source extraction unit may suspend responses and send notifications to the downstream command and plug response units.

(4) Software modules corresponding to the response switch unit 2, the command response unit 30, the plug response unit 40, and the source extraction unit 52 shown in FIGS. 2, 16, and 21 may be implemented in a system of sequentially repeated processing, or implemented in an event-driven system in which the software modules are run as tasks. Also, the response switch command unit, for example, may be included in the command response unit and the plug response unit. Here, important aspects of the present invention are the function for identifying from which node an Async packet has been sent, and switching response types in accordance with groups with reference to the external device management information table.

Accordingly, a hardware sequencer or microprocessor may be used as a method of realizing the above modification.

(5) The present invention may be any combination of the above embodiments 1 to 3 and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data stream transmission/reception device that connects a first external device on a bus to a first internal hardware resource via a logical plug to perform data stream transmission/reception, and connects a second external device on the bus to a second internal hardware resource via an other logical plug to perform data stream transmission/reception, the data stream transmission/reception device comprising:

a first status register operable to indicate a status of the logical plug for connection to the first internal hardware resource;

a second status register operable to indicate a status of the other logical plug for connection to the second internal hardware resource;

a source extraction unit operable to identify a transmission-source external device with reference to an access therefrom; and a response switch unit operable to, (i) if the identified transmission-source external device is the first external device, assign an address of a preferentially-used plug to the first status register, the address existing in an address space that receives the access from the transmission-source external device, and (ii) if the identified transmission-source external device is the second external device, assign the address of the preferentially-used plug to the second status register.

2. The data stream transmission/reception device of claim 1, wherein each external device on the bus has been assigned a different node number for unique identification, and the source extraction unit identifies the transmission-source external device by extracting, from an asynchronous packet received via the bus, the node number that uniquely identifies the first and second external devices.

3. The data stream transmission/reception device of claim 2, wherein the response switch unit is further operable to (i) detect a reset signal indicating that a structure of the bus connecting the data stream transmission/reception device to the first and second external devices has changed after a reset, and (ii) upon detecting the reset signal, reconfirm the node number of each external device by, for each external device, acquiring the node number thereof that was assigned after the reset and a unique device identification number, and suspend assignment of the address until the reconfirmation of the node numbers has been completed.

4. The data stream transmission/reception device of claim 1, further comprising:
   a subunit model check unit operable to request a subunit model notification from each external device on the bus, and receive a response transmitted in accordance with the subunit model notification request; and
   a subunit model notification unit operable to, if the subunit model notification request has been received from the first external device, notify thereto a subunit model that manages the connection to the first internal hardware resource via the preferentially-used plug, and if the subunit model notification request has been received from the second external device, notify a subunit model that manages the connection to the second internal hardware resource via the preferentially-used plug.

5. The data stream transmission/reception device of claim 4, further comprising:
   a check command transmission/reception unit operable to transmit, to each external device on the bus that has the same function as the subunit model notification unit, a command for checking to which of two or more internal hardware resources of said external device the data stream transmission/reception device is to be connected, and receive a response transmitted in accordance with the check command; and
   a check command response unit operable to, if the check command has been received from the first external device, notify thereto that connection is to be established with the first internal hardware resource, and if the check command has been received from the second external device, notify thereto that connection is to be established with the second hardware resource, wherein
   if the first and second internal hardware resources are subunits having mutually different functions, the subunit model notification unit transmits the subunit model notification in response to the received subunit model notification request only after a response to the check command has been received from one of the first and second external devices that has transmitted the subunit model notification request.

6. The data stream transmission/reception device of claim 4, further comprising:
   a device identification number notification unit operable to notify a different device identification number to each of the first and second external devices, each device identification number uniquely identifying the data stream transmission/reception device.

7. The data stream transmission/reception device of claim 1, wherein
   the response switch unit is further operable to, for each internal hardware resource with which an external connection is to be established, manage each external device on the bus in one of a group to which the first external device belongs and a group to which the second external device belongs, and
   in response to an access from an external device on the bus other than the first and second external devices, the source extraction unit identifies said external device, and the response switch unit assigns the address of the preferentially-used plug to, of the first and second status registers, the status register that indicates a connection status of the internal hardware resource corresponding to the group to which said external device belongs.

8. The data stream transmission/reception device of claim 7, further comprising:
   a group setting unit operable to, for each external device on the bus, determine to which group the external device is to belong by judging, based on a type of a command to be received from the external device, whether the external device is to be connected to the first internal hardware resource or the second internal hardware resource.

9. The data stream transmission/reception device of claim 7, further comprising:
   a group setting unit operable to cause a display device to display a list including each external device on the bus, and receive a user operation instructing to which group an external device, from among the listed external devices, is to belong.

10. The data stream transmission/reception device of claim 7, further comprising:
   a group setting unit operable to issue, to one of the external devices on the bus, a command to display a list including each external device on the bus, and receive, from the one of the external devices on the bus, a command notifying information that indicates to which of the groups each external device on the bus belongs.

11. The data stream transmission/reception device of claim 7, further comprising:
   an automatic allocation unit operable to, in response to an access from one of the external devices on the bus, assign the one of the external devices to the group corresponding to the first internal hardware resource, and in response to a subsequent access from an other one of the external devices on the bus, assign the other one of the external devices to the group corresponding to the second internal hardware resource.

* * * * *